(12) United States Patent
Pan et al.

(10) Patent No.: US 11,082,843 B2
(45) Date of Patent: Aug. 3, 2021

(54) COMMUNICATION METHOD AND COMMUNICATIONS APPARATUS

(71) Applicant: HUAWEI TECHNOLOGIES CO., LTD., Shenzhen (CN)

(72) Inventors: Kai Pan, Shanghai (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/870,708

(22) Filed: May 8, 2020

(65) Prior Publication Data

US 2020/0275268 A1    Aug. 27, 2020

Related U.S. Application Data

(63) Continuation of application No. PCT/CN2018/112482, filed on Oct. 29, 2018.

(30) Foreign Application Priority Data

Nov. 14, 2017   (CN) .......................... 201711123039.2

(51) Int. Cl.
*H04L 29/06* (2006.01)
*H04B 7/26* (2006.01)
(Continued)

(52) U.S. Cl.
CPC ........... *H04W 12/06* (2013.01); *H04L 9/3271* (2013.01); *H04L 63/08* (2013.01); *H04W 12/04* (2013.01); *H04L 2209/80* (2013.01)

(58) Field of Classification Search
None
See application file for complete search history.

(56) References Cited

U.S. PATENT DOCUMENTS

2010/0011220 A1  1/2010  Zhao et al.
2013/0326603 A1  12/2013 Kato et al.
(Continued)

FOREIGN PATENT DOCUMENTS

CN    1747384 A    3/2006
CN  101160985 A    4/2008
(Continued)

OTHER PUBLICATIONS

China Mobile, pCR Security enhancement to the attach procedure relying on the public key of the home network. 3GPP TSG SA WG3 (Security) Meeting #88, Aug. 7-11, 2017, Dali, China, S3-171918, 8 pages.

(Continued)

*Primary Examiner* — Gary Lafontant
(74) *Attorney, Agent, or Firm* — Stein IP, LLC

(57) ABSTRACT

A communication method and a communications apparatus in which the method includes: a terminal device receiving a first authentication request from a security function network element, and obtaining authentication reference information based on the first authentication request, where the authentication reference information is a response value, a resynchronization token, or a cause indication value. The terminal device sends an authentication response message to the security function network element, where the authentication response message includes a first information element used to carry the response value, a second information element used to carry the resynchronization token, and a third information element used to carry the cause indication value, and the authentication reference information is carried in an information element corresponding to the authentication reference information.

10 Claims, 12 Drawing Sheets

(51) Int. Cl.
*H04W 12/06* (2021.01)
*H04L 9/32* (2006.01)
*H04W 12/04* (2021.01)

(56) References Cited

U.S. PATENT DOCUMENTS

2015/0087269 A1    3/2015  Lee et al.
2018/0343249 A1*  11/2018  Hahn .................... H04W 12/06
2019/0246272 A1    8/2019  Richard et al.

FOREIGN PATENT DOCUMENTS

| | | | |
|---|---|---|---|
| CN | 101163003 A | 4/2008 | |
| CN | 101272251 A | 9/2008 | |
| CN | 101600205 A | 12/2009 | |
| CN | 102082665 A | 6/2011 | |
| CN | 104219650 A | 12/2014 | |
| EP | 0978958 A1 * | 2/2000 | ............ H04W 88/12 |
| WO | 2018065712 A1 | 4/2018 | |

OTHER PUBLICATIONS

Huawei, Hisilicon, Providing details on the authentication vector and calculation of keys. 3GPP TSG SA WG3 (Security) Meeting #88Bis Adhoc, Oct. 9-13, 2017, Singapore, S3-172578, 5 pages.
3GPP TS 33.501 V0.4.0: 3rd Generation Partnership Project;Technical Specification Group Services and System Aspects;Security Architecture and Procedures for 5G System (Release 15) Oct. 2017 total 50 pages.
Authentication and key agreement, 3GPP TSG CT WG1 Meeting #52 Jeju Island, Korea, 7th Apr. 11, 2008, C1-081268, 4 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/112482, filed on Oct. 29, 2018, which claims priority to Chinese Patent Application No. 201711123039.2, filed on Nov. 14, 2017, the disclosures of the aforementioned applications are hereby incorporated by reference in their entireties.

TECHNICAL FIELD

Aspects of this application relate to the field of communications technologies, and in particular, to a communication method and a communications apparatus.

BACKGROUND

Currently, a fake base station technology poses a comparatively great threat to security of a communications system. For example, a fake base station can obtain an identity of a terminal device, and the identity may be an international mobile subscriber identity (IMSI) or the like. Further, the fake base station may attack the terminal device based on the identity of the terminal device, for example, track a location of the terminal device, resulting in privacy leakage of a user of the terminal device.

For example, the fake base station may apply to a core network for an authentication vector (AV) by using the obtained IMSI, generate an authentication request based on the authentication vector, and send the authentication request to a terminal device. If the terminal device is the terminal device corresponding to the IMSI, the terminal device sends, to the fake base station, a response message used to indicate that authentication succeeds; if the terminal device is not the terminal device corresponding to the IMSI, the terminal device sends, to the fake base station, a response message used to indicate that authentication fails. Therefore, the fake base station may determine, based on the response message, whether the terminal device is the terminal device corresponding to the IMSI.

In the foregoing method, the fake base station may determine whether the terminal device corresponding to the IMSI is located within a signal coverage area of the fake base station. The location of the terminal device corresponding to the IMSI is tracked by continuously changing a location of the fake base station.

In conclusion, how to prevent a terminal device from being attacked is an urgent problem to be resolved.

SUMMARY

Aspects of this application provides a communication method and a communications apparatus, to resolve a problem that a terminal device is attacked.

According to a first aspect, an embodiment of this application provides a communication method. The method includes:

receiving, by a terminal device, a first authentication request from a security function network element;

obtaining, by the terminal device, authentication reference information based on the first authentication request, where the authentication reference information is a response value, a resynchronization token, or a cause indication value; and sending, by the terminal device, an authentication response message to the security function network element, where the authentication response message includes a first information element used to carry the response value, a second information element used to carry the resynchronization token, and a third information element used to carry the cause indication value, and the authentication reference information is carried in an information element corresponding to the authentication reference information.

According to the foregoing method, whether the authentication reference information obtained by the terminal device based on the first authentication request is the response value, the resynchronization token, or the cause indication value, the authentication response message sent by the terminal device to the security function network element includes the first information element, the second information element, and the third information element. According to the method, because the authentication response message sent by the terminal device is in a uniform format, another device cannot directly determine, based on a format of the authentication response message, whether the authentication response message carries the response value, the resynchronization token, or the cause indication value, and cannot determine whether the terminal device verifies the first authentication request. This improves security of the terminal device.

In an optional implementation, the response value is used to instruct a network side (for example, the security function network element) to perform authentication on the terminal device, the resynchronization token is used to request t synchronization of sequence numbers of the terminal device and an authentication network element, and the cause indication value is used to indicate a cause for failure to verify the first authentication request.

In an optional implementation, the authentication reference information is the response value; and before the sending, by the terminal device, an authentication response message to the security function network element, the method further includes:

adding, by the terminal device, the authentication reference information to the first information element, adding a first random number to the second information element, and adding a second random number to the third information element.

According to the foregoing method, the terminal device may add the authentication reference information, the first random number, and the second random number to the first information element, the second information element, and the third information element, respectively, so that the authentication response message in a uniform format can be generated. Because the first random number is added to the second information element, and the second random number is added to the third information element, after determining that the first information element carries the response value, the network side (for example, the security function network element) may ignore the second information element and the third information element. Therefore, compatibility with an existing standard protocol is implemented while security of the terminal device is ensured.

In an optional implementation, the authentication reference information is the resynchronization token; and before the sending, by the terminal device, an authentication response message to the security function network element, the method further includes:

adding, by the terminal device, the authentication reference information to the second information element, adding a third random number to the first information element, and adding a second random number to the third information element.

According to the foregoing method, the terminal device may add the third random number, the authentication reference information, and the second random number to the first information element, the second information element, and the third information element, respectively, so that the authentication response message in a uniform format can be generated. Because the third random number is added to the first information element, and the second random number is added to the third information element, after determining that the first information element does not carry the response value, the network side (for example, the security function network element) may obtain, based on the second information element and the third information element, a cause for failure to verify the first authentication request by the terminal device. Therefore, compatibility with an existing standard protocol is implemented while security of the terminal device is ensured.

In an optional implementation, the authentication reference information is the cause indication value; and before the sending, by the terminal device, an authentication response message to the security function network element, the method further includes:

adding, by the terminal device, the authentication reference information to the third information element, adding a third random number to the first information element, and adding a first random number to the second information element.

According to the foregoing method, the terminal device may add the third random number, the first random number, and the authentication reference information to the first information element, the second information element, and the third information element, respectively, so that the authentication response message in a uniform format can be generated. Because the third random number is added to the first information element, and the second random number is added to the third information element, when determining that information carried in the second information element fails to be verified, the network side (for example, the security function network element) may obtain, based on the cause indication value carried in the third information element, a cause for failure to verify the first authentication request by the terminal device. Therefore, compatibility with an existing standard protocol is implemented while security of the terminal device is ensured.

According to a second aspect, an embodiment of this application provides a communications apparatus. The communications apparatus includes a memory, a transceiver, and a processor. The memory is configured to store an instruction. The processor is configured to execute the instruction stored in the memory, and control the transceiver to receive and send signals. When the processor executes the instruction stored in the memory, the communications apparatus is configured to perform the method according to the first aspect or any possible design of the first aspect.

According to a third aspect, an embodiment of this application provides a communications apparatus, configured to implement the first aspect or any method in the first aspect. The communications apparatus includes corresponding functional modules, such as a processing unit, a receiving unit, and a sending unit, that are respectively used to implement the steps in the foregoing method.

According to a fourth aspect, an embodiment of this application provides a computer-readable storage medium. The computer storage medium stores a computer-readable instruction. When a computer reads and executes the computer-readable instruction, the computer is enabled to perform the method according to the first aspect or any possible design of the first aspect.

According to a fifth aspect, an embodiment of this application provides a computer program product. When a computer reads and executes the computer program product, the computer is enabled to perform the method according to the first aspect or any possible design of the first aspect.

According to a sixth aspect, an embodiment of this application provides a chip. The chip is connected to a memory, and is configured to read and execute a software program stored in the memory, to implement the method according to the first aspect or any possible design of the first aspect.

According to a seventh aspect, an embodiment of this application provides a communication method. The method includes:

sending, by a security function network element, a first authentication request to a terminal device;

receiving, by the security function network element, an authentication response message from the terminal device, where the authentication response message includes a first information element used to carry a response value, a second information element used to carry a resynchronization token, and a third information element used to carry a cause indication value; and when information carried in the first information element is verified, sending, by the security function network element, a security mode command to the terminal device.

According to the foregoing method, after receiving the authentication response message, when determining that the information carried in the first information element in the authentication response message is verified, the security function network element ignores the second information element and the third information element in the authentication response message, and performs security key and algorithm negotiation with the terminal device. Because the authentication response message sent by the terminal device is in a uniform format, another device cannot directly determine, based on a format of the authentication response message, whether the authentication response message carries the response value, the resynchronization token, or the cause indication value, and cannot determine whether the terminal device verifies the first authentication request. This improves security of the terminal device.

In an optional implementation, the method further includes:

when the information carried in the first information element fails to be verified, sending, by the security function network element, the second information element to an authentication network element;

receiving, by the security function network element, an authentication vector from the authentication network element, and sending a second authentication request to the terminal device based on the authentication vector; or receiving, by the security function network element, a verification result from the authentication network element, where the verification result is used to indicate that information carried in the second information element fails to be verified, and sending, by the security function network element, an authentication reject message to the terminal device based on the cause indication value carried in the third information element.

According to an eighth aspect, an embodiment of this application provides a communications apparatus. The communications apparatus includes a memory, a communications interface, and a processor. The memory is configured to store an instruction. The processor is configured to execute the instruction stored in the memory, and control the communications interface to receive and send signals. When the processor executes the instruction stored in the memory, the communications apparatus is configured to perform the method according to the seventh aspect or any possible design of the seventh aspect.

According to a ninth aspect, an embodiment of this application provides a communications apparatus, configured to implement the seventh aspect or any method in the seventh aspect. The communications apparatus includes corresponding functional modules, such as a processing unit, a receiving unit, and a sending unit, that are respectively used to implement the steps in the foregoing method.

According to a tenth aspect, an embodiment of this application provides a computer-readable storage medium. The computer storage medium stores a computer-readable instruction. When a computer reads and executes the computer-readable instruction, the computer is enabled to perform the method according to the seventh aspect or any possible design of the seventh aspect.

According to an eleventh aspect, an embodiment of this application provides a computer program product. When a computer reads and executes the computer program product, the computer is enabled to perform the method according to the seventh aspect or any possible design of the seventh aspect.

According to a twelfth aspect, an embodiment of this application provides a chip. The chip is connected to a memory, and is configured to read and execute a software program stored in the memory, to implement the method according to the seventh aspect or any possible design of the seventh aspect.

According to a thirteenth aspect, an embodiment of this application provides a communication method, including:
  obtaining, by a terminal device, an identity authentication code based on a user identity of the terminal device, a preset parameter, and a root key of the terminal device; and
  sending, by the terminal device, the identity authentication code, a ciphertext of the user identity, and a plaintext or ciphertext of the preset parameter to an authentication server function network element.

According to the foregoing method, the terminal device sends the identity authentication code, the ciphertext of the user identity, and the plaintext or ciphertext of the preset parameter to the authentication server function network element, so that an authentication network element can perform verification on the identity authentication code based on the user identity and the preset parameter, and when verifying the identity authentication code, determine that the terminal device is a terminal device corresponding to the user identity, to complete authentication on the terminal device. The foregoing method protects the terminal device from an unauthorized attack by another device that masquerades as the terminal device and sends the user identity of the terminal device to a network side after the another device intercepts the user identity of the terminal device, and improves security of the terminal device.

In an optional implementation, the terminal device receives an authentication request from a security function network element, where the authentication request is determined by the security function network element based on an authentication vector generated by the authentication network element.

In an optional implementation, the obtaining, by a terminal device, an identity authentication code based on a user identity of the terminal device, a preset parameter, and a root key of the terminal device includes:
  obtaining, by the terminal device, a generation parameter based on the preset parameter, the root key, and a public key, where the public key is a key used to encrypt the user identity; and
  obtaining, by the terminal device, the identity authentication code based on the generation parameter and the user identity.

In an optional implementation, the preset parameter is a sequence number SQN or a random number.

According to a fourteenth aspect, an embodiment of this application provides a communications apparatus. The communications apparatus includes a memory, a transceiver, and a processor. The memory is configured to store an instruction. The processor is configured to execute the instruction stored in the memory, and control the transceiver to receive and send signals. When the processor executes the instruction stored in the memory, the communications apparatus is configured to perform the method according to the thirteenth aspect or any possible design of the thirteenth aspect.

According to a fifteenth aspect, an embodiment of this application provides a communications apparatus, configured to implement the thirteenth aspect or any method in the thirteenth aspect. The communications apparatus includes corresponding functional modules, such as a processing unit, a receiving unit, and a sending unit, that are respectively used to implement the steps in the foregoing method.

According to a sixteenth aspect, an embodiment of this application provides a computer-readable storage medium. The computer storage medium stores a computer-readable instruction. When a computer reads and executes the computer-readable instruction, the computer is enabled to perform the method according to the thirteenth aspect or any possible design of the thirteenth aspect.

According to a seventeenth aspect, an embodiment of this application provides a computer program product. When a computer reads and executes the computer program product, the computer is enabled to perform the method according to the thirteenth aspect or any possible design of the thirteenth aspect.

According to an eighteenth aspect, an embodiment of this application provides a chip. The chip is connected to a memory, and is configured to read and execute a software program stored in the memory, to implement the method according to the thirteenth aspect or any possible design of the thirteenth aspect.

According to a nineteenth aspect, an embodiment of this application provides a communication method. The method includes:
  receiving, by an authentication network element, an identity authentication code, a user identity of a terminal device, and a preset parameter from an authentication server function network element;
  performing, by the authentication network element, verification on the identity authentication code based on the user identity and the preset parameter; and
  when the identity authentication code is verified, sending, by the authentication network element, an authentication vector to an authentication server function (AUSF) network element.

According to the foregoing method, after receiving the identity authentication code, the user identity of the terminal device, and the preset parameter, when verifying the identity authentication code based on the user identity and the preset parameter, the authentication network element may determine that the terminal device is a terminal device corresponding to the user identity, to complete authentication on the terminal device. The foregoing method prevents another device from masquerading as the terminal device and improves security of the terminal device.

In an optional implementation, the performing, by the authentication network element, verification on the identity authentication code based on the user identity and the preset parameter includes:

obtaining, by the authentication network element, a root key of the terminal device based on the user identity; and obtaining, by the authentication network element, a generation parameter based on the root key and the preset parameter, and obtaining an expected identity authentication code based on the generation parameter and the user identity; where when the expected identity authentication code is the same as the identity authentication code, the identity authentication code is verified; or when the expected identity authentication code is different from the identity authentication code, the identity authentication code fails to be verified.

In an optional implementation, when the identity authentication code fails to be verified, the method further includes:

sending, by the authentication network element, a failure response to the AUSF network element.

According to a twentieth aspect, an embodiment of this application provides a communications apparatus. The communications apparatus includes a memory, a communications interface, and a processor. The memory is configured to store an instruction. The processor is configured to execute the instruction stored in the memory, and control the communications interface to receive and send signals. When the processor executes the instruction stored in the memory, the communications apparatus is configured to perform the method according to the nineteenth aspect or any possible design of the nineteenth aspect.

According to a twenty-first aspect, an embodiment of this application provides a communications apparatus, configured to implement the nineteenth aspect or any method in the nineteenth aspect. The communications apparatus includes corresponding functional modules, such as a processing unit, a receiving unit, and a sending unit, that are respectively used to implement the steps in the foregoing method.

According to a twenty-second aspect, an embodiment of this application provides a computer-readable storage medium. The computer storage medium stores a computer-readable instruction. When a computer reads and executes the computer-readable instruction, the computer is enabled to perform the method according to the nineteenth aspect or any possible design of the nineteenth aspect.

According to a twenty-third aspect, an embodiment of this application provides a computer program product. When a computer reads and executes the computer program product, the computer is enabled to perform the method according to the nineteenth aspect or any possible design of the nineteenth aspect.

According to a twenty-fourth aspect, an embodiment of this application provides a chip. The chip is connected to a memory, and is configured to read and execute a software program stored in the memory, to implement the method according to the nineteenth aspect or any possible design of the nineteenth aspect.

DESCRIPTION OF EMBODIMENTS

The following further describes in detail this application with reference to accompanying drawings.

Embodiments of this application may be applicable to the following mobile communications systems, for example, a long term evolution (LTE) system, a long term evolution advanced (LTE-A) system, a universal mobile telecommunications system (UMTS), an evolved long term evolution (eLTE) system, a fifth generation (5G) system, or another future evolved mobile communications system.

The following uses the 5G system as an example to show a schematic diagram of a 5G system architecture applicable to the embodiments of this application. The system architecture may be applied to the embodiments of this application. This is not limited.

Figure 1:
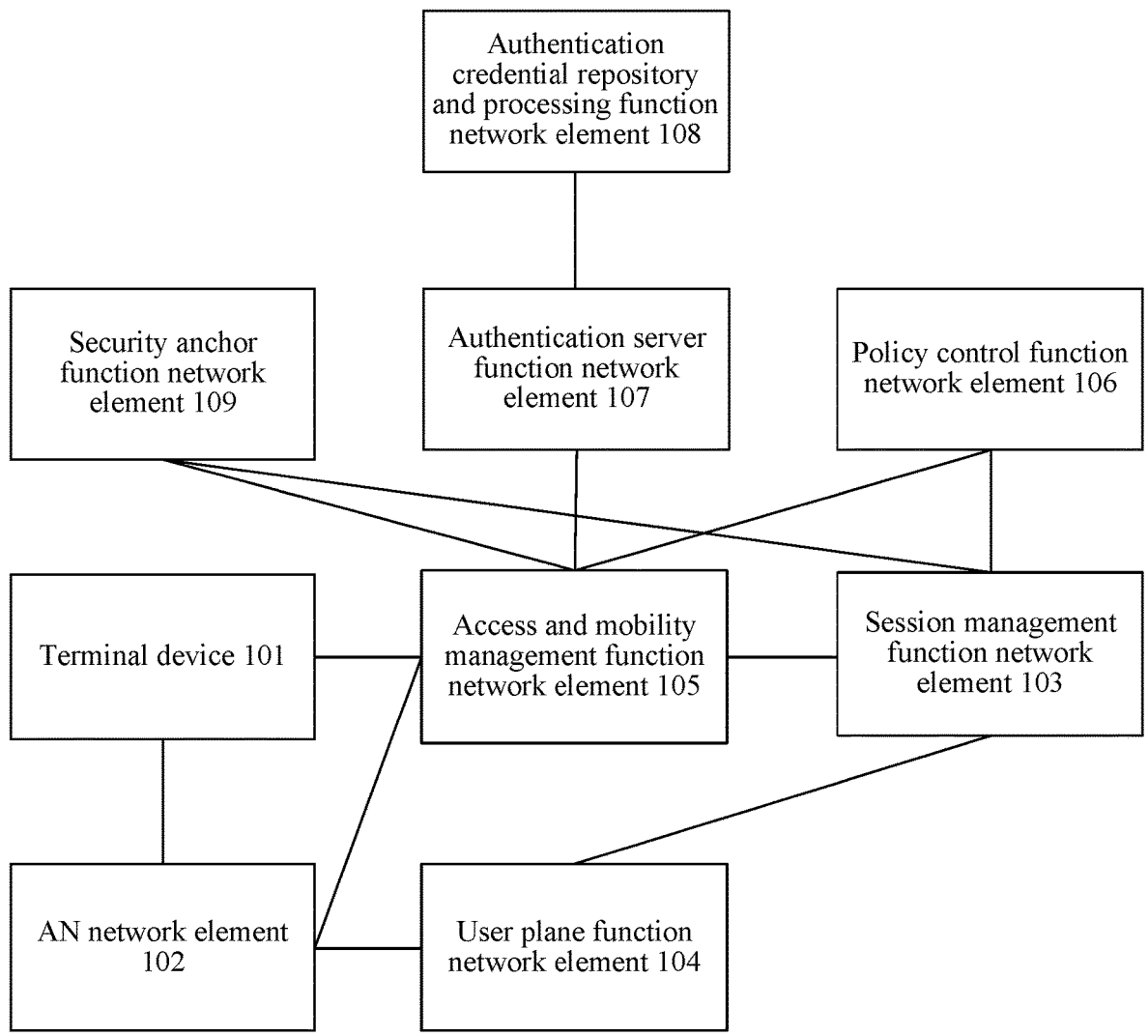
FIG. 1 is a schematic diagram of a system architecture applicable to an embodiment of this application.

In the system architecture shown in FIG. 1, a terminal device 101 may communicate with a core network by using an access network (AN) network element 102. The core network may include a session management function (SMF) network element 103, a user plane function (UPF) network element 104, an access and mobility management function (AMF) network element 105, and a policy control function (PCF) network element 106, an authentication server function (AUSF) network element 107, an authentication credential repository and processing function (ARPF) network element 108, and a security anchor function (SEAF) 109.

The terminal device 101 may be user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device 101 may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in the 5G system, or the like.

The AN network element 102 may also be referred to as a radio access network (RAN) network element. The AN network element 102 is configured to provide a wireless connection for the terminal device 101 to ensure reliable transmission of uplink and downlink data of the terminal device 101, or the like. The AN network element 102 may be a gNB (next generation Node B) in the 5G system, a base transceiver station (BTS) in a global system for mobile communications (GSM) system or a code division multiple access (CDMA) system, a NodeB (NB) in a WCDMA system, or an evolved NodeB (eNB or eNodeB) in the LTE system.

The SMF network element 103 is configured to perform some functions of a mobility management entity (MME) in the LTE system, for example, establish and manage a session for the terminal device 101, or may select an appropriate UPF network element for the terminal device 101 based on location information of the terminal device 101.

The UPF network element 104 is configured to perform packet routing and forwarding, quality of service (QoS) processing of user plane data, or the like.

The AMF network element 105 is configured to perform mobility management, lawful interception, access authorization or authentication, or the like.

The PCF network element 106 is configured to provide a policy or the like for a control plane, subscription information access, or the like.

The AUSF network element 107 is configured to obtain and process a received authentication vector.

The ARPF network element 108 is configured to store and process a long-term security credential.

The SEAF network element 109 is configured to derive and send a non-access stratum root key.

It should be noted that the SEAF network element 109 in the foregoing system may be combined with another network element. For example, a function of the SEAF network element 109 may alternatively be implemented by the AMF network element 105. In this case, the foregoing system may not include an independent SEAF network element. This is not limited.

The following explains some terms in this application.

An authentication network element may be an ARPF network element, a network element having a function of the ARPF network element, such as a unified data management (Unified Data Management, UDM) network element, or the like in a 5G system; and may be a home subscriber server (HSS) in a 4G system.

A security function network element may be a SEAF network element, an AMF network element, which may have a function of the SEAF, another network element having the function of the SEAF, or the like in the 5G system; and may be a mobility management entity (MME) in the 4G system.

In this application, the network element mentioned above may be a physical network element, or may be a virtual network element, for example, a functional module on a physical device. This is not limited herein.

Figure 2A:
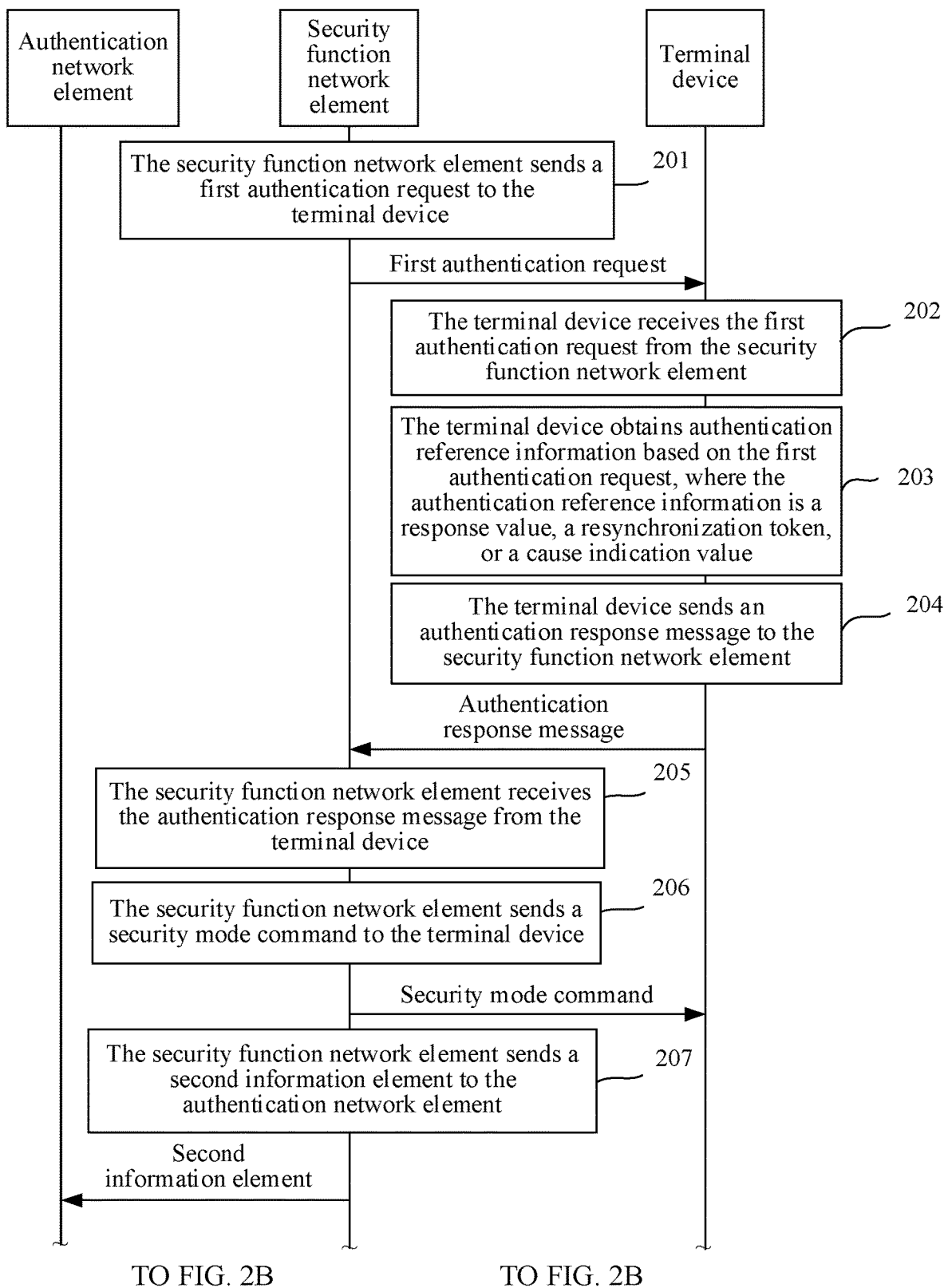
FIG. 2A and FIG. 2B are schematic flowcharts of a communication method according to an embodiment of this application.
Figure 2B:
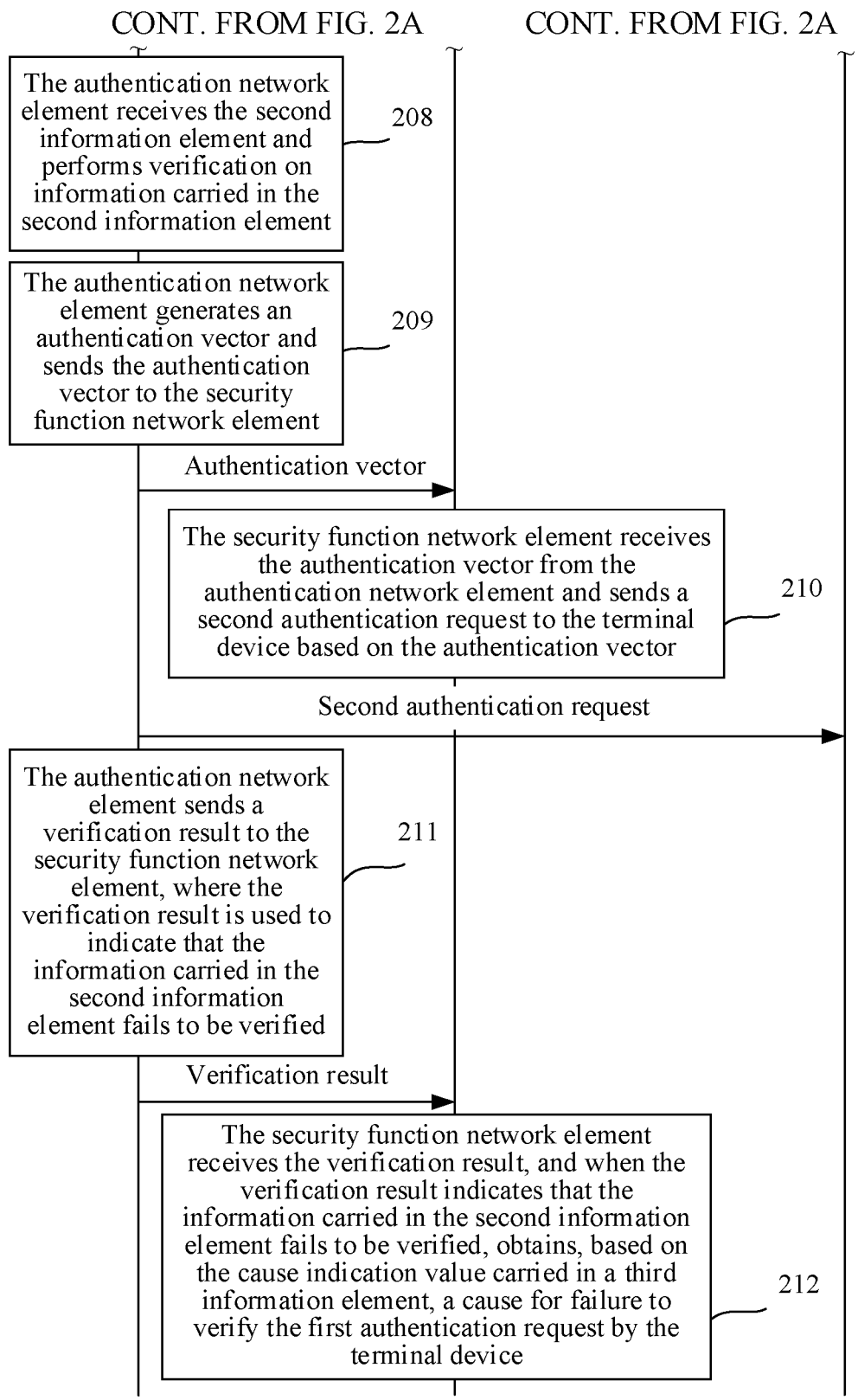

FIG. 2A and FIG. 2B are a schematic flowchart of a communication method according to an embodiment of this application. Referring to FIG. 2A and FIG. 2B, the method includes the following steps.

Step 201: A security function network element sends a first authentication request to a terminal device.

The first authentication request may include an authentication token (AUTN). The first authentication request may be used to request the terminal device to perform verification on the AUTN, namely, content carried in the first authentication request, or the first authentication request. The first authentication request may further include a random number (RAND).

The AUTN may be obtained by using the following formula:

$$AUTN := SQN \text{ xor } AK \| AMF \| MAC$$

The SQN represents a sequence number, the AK represents an anonymity key, xor represents an exclusive OR operation, the AMF represents an authentication management field, the MAC represents a message authentication code, and $\|$ is a concatenation operator.

It should be noted that the security function network element may directly send the first authentication request to the terminal device, or may send the first authentication request to the terminal device by using another communications device such as an access network device. In addition, before the security function network element sends the first authentication request to the terminal device, two-way authentication may be performed between the terminal device and the security function network element. This belongs to the prior art, and details are not described herein.

Step 202: The terminal device receives the first authentication request from the security function network element.

Step 203: The terminal device obtains authentication reference information based on the first authentication request, where the authentication reference information is a response value, a resynchronization token, or a cause indication value.

The response value may be used to instruct a network side (for example, the security function network element) to perform authentication on the terminal device, or may be used to indicate that the terminal device verifies the AUTN or the first authentication request. This is not limited in this embodiment of this application.

The resynchronization token may be used to request to synchronize sequence numbers of the terminal device and an authentication network element.

The cause indication value may be used to indicate a cause for failure to verify the first authentication request, for example, the AMF has an error or SQNs of the terminal device and the authentication network element are different.

For a manner of obtaining the authentication reference information, refer to related descriptions in the following embodiments shown in FIG. 2A and FIG. 2B to FIG. 4, for example, step 301 or step 401.

For example, when the terminal device verifies the first authentication request, the terminal device may generate the response (RES) value based on the first authentication request. When the terminal device fails to verify the first authentication request, and a failure cause is that the MAC in the first authentication request is verified, but the SQN in the first authentication request is not within a preset range, the terminal device may generate the resynchronization token (AUTS). When the terminal device fails to verify the first authentication request, and a failure cause is that the MAC in the first authentication request fails to be verified, the terminal device may generate the cause indication value.

Step 204: The terminal device sends an authentication response message to the security function network element.

The authentication response message includes a first information element used to carry the response value, a second information element used to carry the resynchronization token, and a third information element used to carry the cause indication value, and the authentication reference information is carried in an information element corresponding to the authentication reference information.

For example, when the authentication reference information is the response value, the authentication reference information is carried in the first information element; when the authentication reference information is the resynchronization token, the authentication reference information is carried in the second information element; or when the authentication reference information is the cause indication value, the authentication reference information is carried in the third information element.

In this embodiment of this application, the authentication response message may have a fixed length. For example, the authentication response message is a message of a preset length.

Step 205: The security function network element receives the authentication response message from the terminal device.

Steps 206 and 207 are optional steps. For example, when information carried in the first information element in the authentication response message is verified, step 206 is performed; and/or when information carried in the first information element fails to be verified, step 207 is performed.

Specifically, the security function network element may perform, by using the following method, verification on the information carried in the first information element.

The security function network element compares an expected response (XRES) value in an authentication vector corresponding to the first authentication request with the information carried in the first information element. If the expected response value is the same as the information carried in the first information element, the information carried in the first information element is verified. In other words, the information carried in the first information element is the response value. Otherwise, the information carried in the first information element fails to be verified. In other words, the information carried in the first information element is not the response value.

The authentication vector corresponding to the first authentication request may be used by the security function network element to determine the first authentication request. Specifically, the authentication vector corresponding to the first authentication request may be generated by the authentication network element and sent to the security function network element by using an AUSF network element.

Step 206: The security function network element sends a security mode command to the terminal device.

The security mode command may be used by the security function network element to perform security key and algorithm negotiation with the terminal device.

Step 207: The security function network element sends the second information element carried in the authentication response message to the authentication network element.

Specifically, the security function network element may send the second information element to the authentication network element by using the AUSF network element.

Optionally, the method further includes the following steps 208 to 212.

Step 208: The authentication network element receives the second information element and performs verification on information carried in the second information element.

When the information carried in the second information element is verified, steps 209 and 210 may be performed; and/or when the information carried in the second information element fails to be verified, steps 211 and 212 may be performed.

Step 209: The authentication network element generates an authentication vector, and sends the authentication vector to the security function network element.

Specifically, the authentication network element may send the authentication vector to the security function network element by using the AUSF network element.

Step 210: The security function network element receives the authentication vector from the authentication network element, and sends a second authentication request to the terminal device based on the authentication vector.

The authentication vector may include the RAND, the expected response value, a key KASME, and the AUTN.

The key KASME may be an anchor key used by the terminal device and the security function network element to derive a non-access stratum key and an access stratum key. Alternatively, the authentication vector may include the RAND, a hash value determined based on the expected response, an anchor key used by the terminal device and the security function network element to derive a non-access stratum key and an access stratum key, and the AUTN.

Specifically, the security function network element may use the RAND and the AUTN in the authentication vector as the second authentication request.

Step 211: The authentication network element sends a verification result to the security function network element, where the verification result is used to indicate that the information carried in the second information element fails to be verified.

Specifically, the authentication network element may send the verification result to the security function network element by using the AUSF network element.

Step 212: The security function network element receives the verification result, and when the verification result indicates that the information carried in the second information element fails to be verified, obtains, based on the cause indication value carried in the third information element, a cause for failure to verify the first authentication request by the terminal device.

There may be a correspondence between the cause indication value and the cause for failure to verify the first authentication request by the terminal device. The security function network element may use a cause corresponding to the cause indication value as the cause for failure to verify the first authentication request by the terminal device.

In the method provided in this embodiment, whether the authentication reference information obtained by the terminal device based on the first authentication request is the response value, the resynchronization token, or the cause indication value, the authentication response message sent by the terminal device to the security function network element includes the three information elements used to carry the response value, the resynchronization token, and the cause indication value. In other words, the authentication response message sent by the terminal device is in a uniform format. Because the authentication response message sent by the terminal device is in the uniform format, another device cannot directly determine, based on a format of the authentication response message, whether the authentication response message carries the response value, the resynchronization token, or the cause indication value, and cannot determine whether the terminal device verifies the first authentication request. This improves security of the terminal device.

When the first information element carries the response value, after determining that the first information element carries the response value, the security function network element may ignore the second information element and the third information element. Correspondingly, when the first information element does not carry the response value, the security function network element may perform verification on the second information element by using the authentication network element, to determine, based on the verification result of the second information element, information carried in the third information element. The foregoing communication method is the same as an existing standard protocol. Therefore, compatibility with the existing standard protocol can be implemented while security of the terminal device is ensured.

The following describes how the security function network element processes the authentication reference information when the terminal device obtains different authentication reference information based on the first authentication request in different cases.

Figure 3:
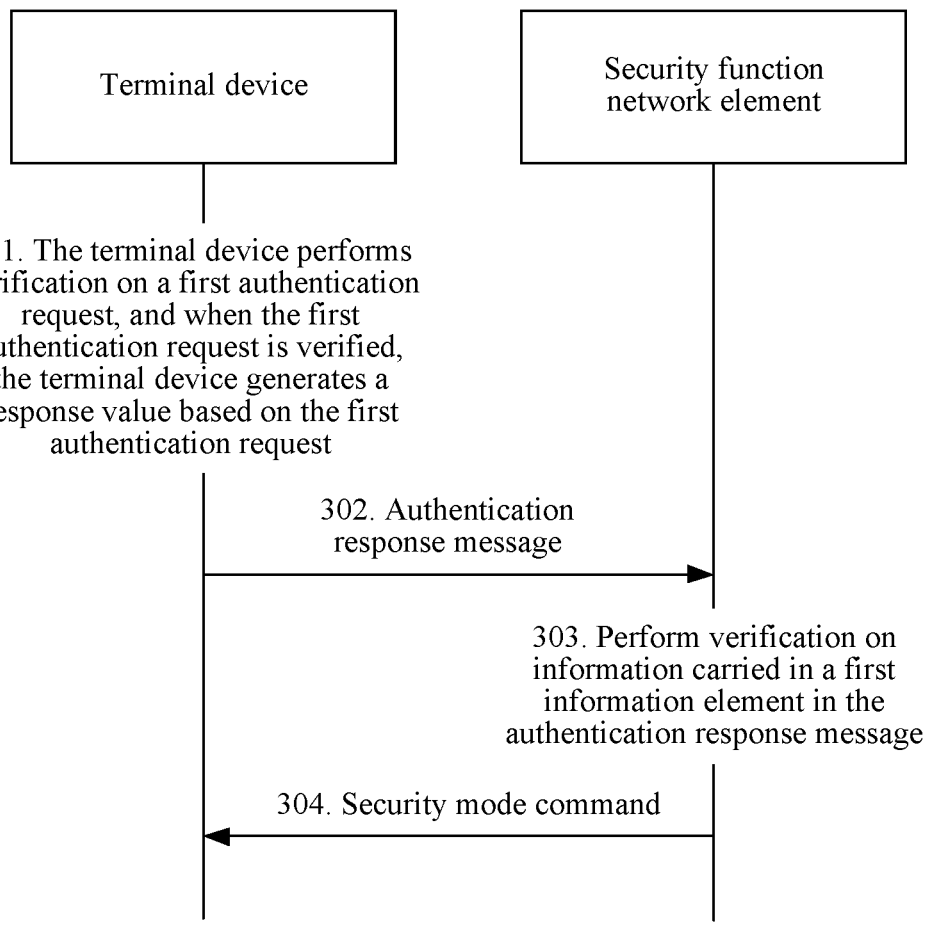
FIG. 3 is a schematic flowchart of another communication method according to an embodiment of this application.

FIG. 3 is a schematic flowchart of a communication method according to an embodiment of this application. The embodiment shown in FIG. 3 may be based on the embodiment shown in FIG. 2A and FIG. 2B. This is not limited. In a procedure shown in FIG. 3, an example in which authentication reference information is a response (RES) value is used for description.

Step 301: A terminal device performs verification on a first authentication request, and when the first authentication request is verified, the terminal device generates a response value based on the first authentication request.

For example, the terminal device obtains an expected message authentication code (XMAC) and an SQN based on the first authentication request, and the terminal device compares the XMAC with a MAC in an AUTN in the first authentication request. If the XMAC is the same as the MAC, and the SQN is within a preset range, it indicates that the first authentication request is verified, and the terminal device generates the response value based on the first authentication request. Specifically, the terminal device may use a root key K of the terminal device and a RAND in the first authentication request as input parameters of a preset function, and use, as the response value, an output result obtained by calculating the preset function by using the input parameters. The preset function is a function specified in an existing communications standard, and details are not described herein.

In this embodiment of this application, the SQN may be determined based on the AUTN, the RAND, and K in the first authentication request; the XMAC may be determined based on the RAND, K, the SQN, and an AMF in the AUTN; and the RES value may be determined based on K and the RAND. Specific manners of generating the SQN and the XMAC belong to the prior art, and details are not described herein.

For the first authentication request, refer to related descriptions in steps 201 and 202 in the embodiment shown in FIG. 2A and FIG. 2B. In addition, step 301 may be understood as a specific implementation of step 203. In other words, step 203 may include step 301. This is not limited.

Step 302: The terminal device adds the response value to a first information element in an authentication response message, adds a first random number to a second information element in the authentication response message, adds a second random number to a third information element in the authentication response message, and sends the authentication response message to a security function network element.

The first random number and the second random number may be randomly generated, or may be generated in another manner. This is not limited in this embodiment of this application.

Step 303: After receiving the authentication response message, the security function network element performs verification on information carried in the first information element in the authentication response message.

For example, if the information carried in the first information element in the authentication response message is verified, the security function network element may determine that the first information element includes the response value, and ignore the second information element and the third information element.

Step 304: The security function network element sends a security mode command to the terminal device.

The security mode command may be used by the security function network element to perform security key and algorithm negotiation with the terminal device.

For specific content of this step, refer to descriptions in the prior art. Details are not described herein.

In the method provided in this embodiment, when the first information element carries the response value, after determining that the first information element carries the response value, the security function network element may ignore the second information element and the third information element. Therefore, compatibility with an existing standard protocol can be implemented while security of the terminal device is ensured.

Figure 4:
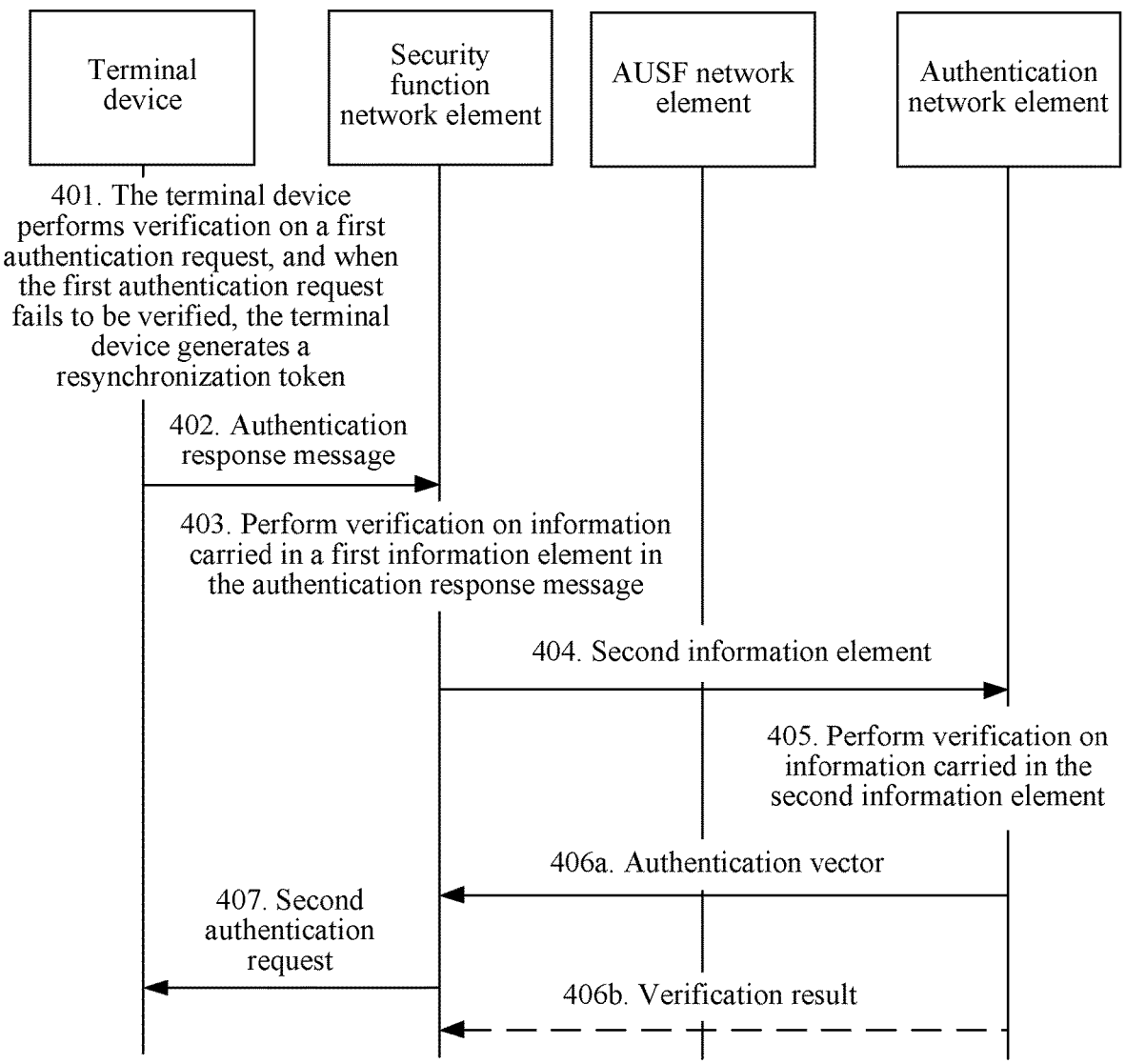
FIG. 4 is a schematic flowchart of another communication method according to an embodiment of this application.

FIG. 4 is a schematic flowchart of a communication method according to an embodiment of this application. In a procedure shown in FIG. 4, an example in which authentication reference information is a resynchronization token is used for description.

Step 401: A terminal device performs verification on a first authentication request, and when the first authentication request fails to be verified, the terminal device generates a resynchronization token.

For example, the terminal device obtains an XMAC and an SQN based on the first authentication request, and the terminal device compares the XMAC with a MAC included in an AUTN in the first authentication request. If the XMAC is the same as the MAC, but the SQN is not within a preset range, it indicates that the first authentication request fails to be verified, and the terminal device generates the resynchronization token.

For the XMAC and the SQN, refer to related descriptions in the embodiment shown in FIG. 3. Details are not described again.

The resynchronization token may be generated based on the SQN, an AK, and the XMAC, and an expression of the resynchronization token may be as follows:

$$AUTS = SQN \text{ xor } AK \| XMAC$$

xor represents an exclusive OR operation, and ∥ is a concatenation operator.

For the first authentication request, refer to related descriptions in steps 201 and 202 in the embodiment shown in FIG. 2A and FIG. 2B. In addition, step 401 may be understood as a specific implementation of step 203. In other words, step 203 may include step 401. This is not limited.

Step 402: The terminal device adds a third random number to a first information element in an authentication response message, adds the resynchronization token to a second information element in the authentication response message, adds a second random number to a third information element in the authentication response message, and sends the authentication response message to a security function network element.

The third random number may be randomly generated, or may be generated in another manner. This is not limited in this embodiment of this application.

Step 403: After receiving the authentication response message, the security function network element performs verification on information carried in the first information element in the authentication response message.

For step 403 in which the verification is performed on the information carried in the first information element, refer to related descriptions in the embodiment shown in FIG. 3. Details are not described again.

Step 404: When the information carried in the first information element in the authentication response message fails to be verified, the security function network element sends the second information element to an authentication network element by using an AUSF network element.

Certainly, the mobility management network element may also send the first information element and the third information element to the authentication network element. This is not limited in this embodiment of this application.

Step 405: After receiving the second information element, the authentication network element performs verification on information carried in the second information element.

Specifically, the authentication network element may generate an expected resynchronization token based on a method for generating the resynchronization token by the terminal device (the method may be agreed on by the security function network element and the terminal device in advance), for example, based on the SQN, the AK, and the XMAC, and determine whether the expected resynchronization token is the same as the information carried in the second information element. If the expected resynchronization token is the same as the information carried in the second information element, the information carried in the second information element is verified; otherwise, the information carried in the second information element fails to be verified.

Step 406a: When the information carried in the second information element is verified, the authentication network element sends an authentication vector to the security function network element by using the AUSF network element.

Step 407: After receiving the authentication vector sent by the authentication network element, the security function network element determines that the information carried in the second information element is verified, and sends a second authentication request to the terminal device.

Alternatively, when the information carried in the second information element in step 405 fails to be verified, step 406a and step 407 may be replaced by step 406b.

Step 406b: When the information carried in the second information element fails to be verified, the authentication network element sends a verification result to the security function network element by using the AUSF network element, where the verification result is used to indicate that the information carried in the second information element fails to be verified.

In the method provided in this embodiment, after determining that the first information element does not carry a response value, when determining that the information carried in the second information element is verified, the security function network element may ignore the third information element and determine a cause for failure to verify the first authentication request by the terminal device. Therefore, compatibility with an existing standard protocol is implemented while security of the terminal device is ensured.

Figure 5:
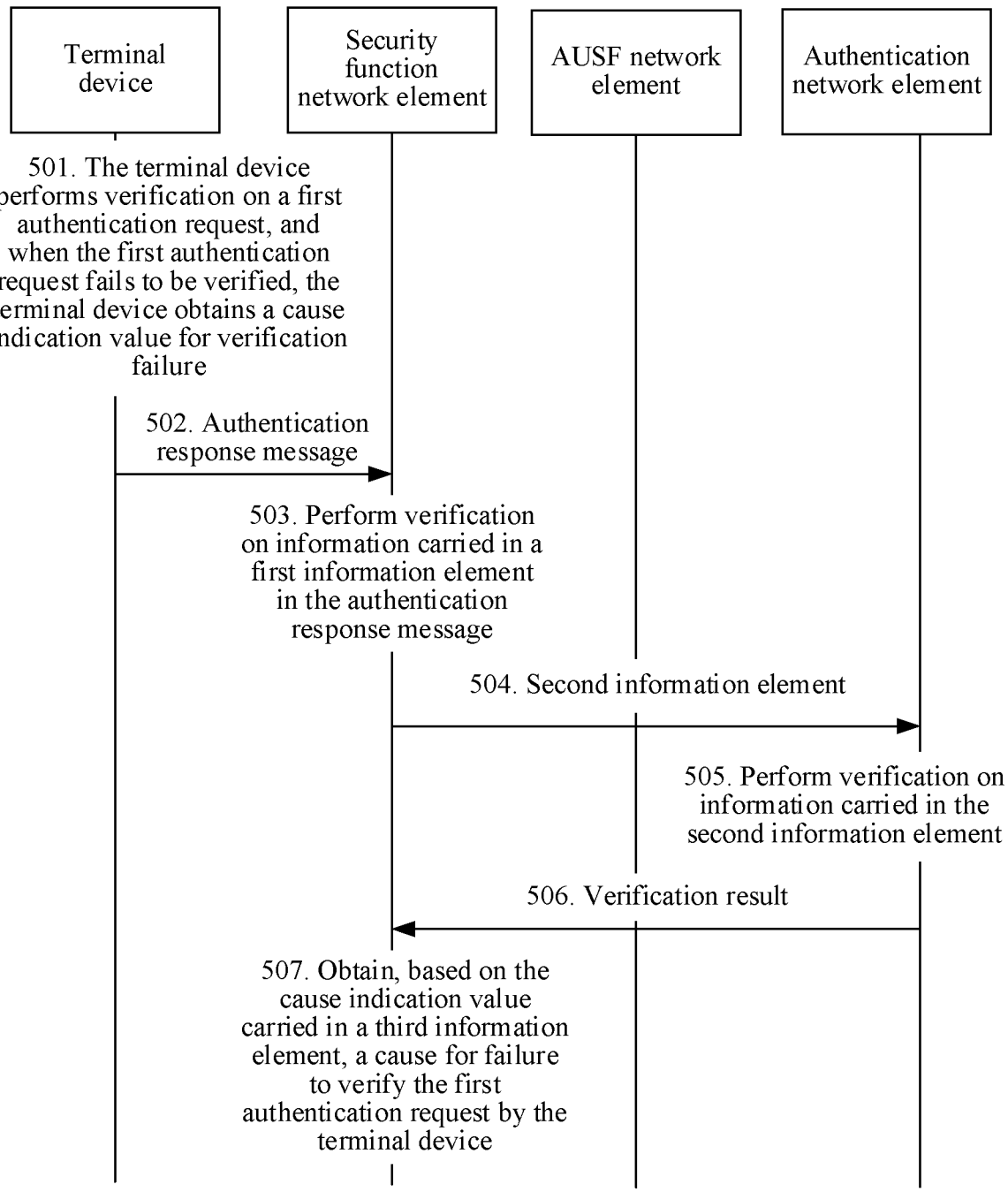
FIG. 5 is a schematic flowchart of another communication method according to an embodiment of this application.

FIG. 5 is a schematic flowchart of a communication method according to an embodiment of this application. In a procedure shown in FIG. 5, an example in which authentication reference information is a cause indication value is used for description.

Step 501: A terminal device performs verification on a first authentication request, and when the first authentication request fails to be verified, the terminal device obtains a cause indication value for verification failure.

For example, the terminal device calculates an XMAC and an SQN based on the first authentication request, and the terminal device compares the XMAC with a MAC included in an AUTN in the first authentication request. If the XMAC is different from the MAC, it indicates that the first authentication request fails to be verified, and the terminal device obtains the cause indication value corresponding to the verification failure.

For the XMAC and the SQN, refer to related descriptions in the embodiment shown in FIG. 3. Details are not described again.

For the first authentication request, refer to related descriptions in steps 201 and 202 in the embodiment shown in FIG. 2A and FIG. 2B. In addition, step 501 may be understood as a specific implementation of step 203. In other words, step 203 may include step 501. This is not limited.

Step 502: The terminal device adds a third random number to a first information element in an authentication response message, adds a second random number to a second information element in the authentication response message, adds the cause indication value to a third information element in the authentication response message, and sends the authentication response message to a security function network element.

The third random number may be randomly generated, or may be generated in another manner. This is not limited in this embodiment of this application.

Step 503: After receiving the authentication response message, the security function network element performs verification on information carried in the first information element in the authentication response message.

For step 503 in which the verification is performed on the information carried in the first information element, refer to related descriptions in the embodiment shown in FIG. 4. Details are not described again.

Step 504: When the information carried in the first information element in the authentication response message fails to be verified, the security function network element sends the second information element to an authentication network element by using an AUSF network element.

Certainly, the mobility management network element may also send the first information element and the third information element to the authentication network element. This is not limited in this embodiment of this application.

Step 505: After receiving the second information element, the authentication network element performs verification on information carried in the second information element.

For step 505 in which the verification is performed on the information carried in the second information element, refer to related descriptions in the embodiment shown in FIG. 4. Details are not described again.

Step 506: When the information carried in the second information element fails to be verified, the authentication network element sends a verification result to the security function network element by using the AUSF network element, where the verification result is used to indicate that the information carried in the second information element fails to be verified.

Step 507: The security function network element receives the verification result, and when the verification result indicates that the information carried in the second information element fails to be verified, obtains, based on the cause indication value carried in the third information element, a cause for failure to verify the first authentication request by the terminal device.

In the method provided in this embodiment, after determining that the first information element does not carry the response value, when determining that the information carried in the second information element fails to be verified, the security function network element may obtain, based on the cause indication value carried in the third information element, the cause for failure to verify the first authentication request by the terminal device. Therefore, compatibility with an existing standard protocol is implemented while security of the terminal device is ensured.

In the embodiments of this application, before sending an authentication request to the terminal device, the security function network element may further perform authentication on the terminal device, and after the authentication succeeds, send the authentication request to the terminal device. The following provides detailed descriptions.

Figure 6A:
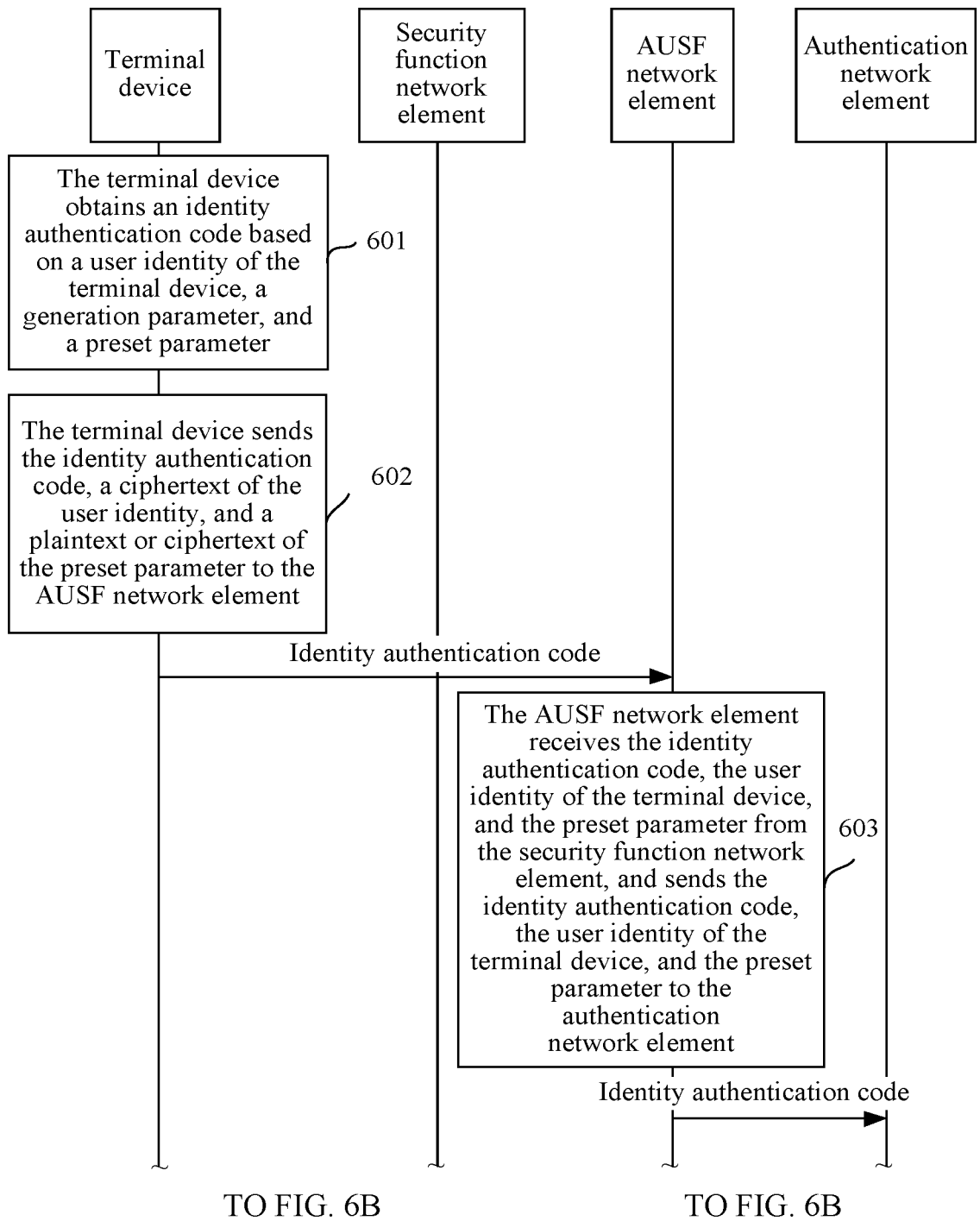
FIG. 6A and FIG. 6B are schematic flowcharts of still another communication method according to an embodiment of this application.
Figure 6B:
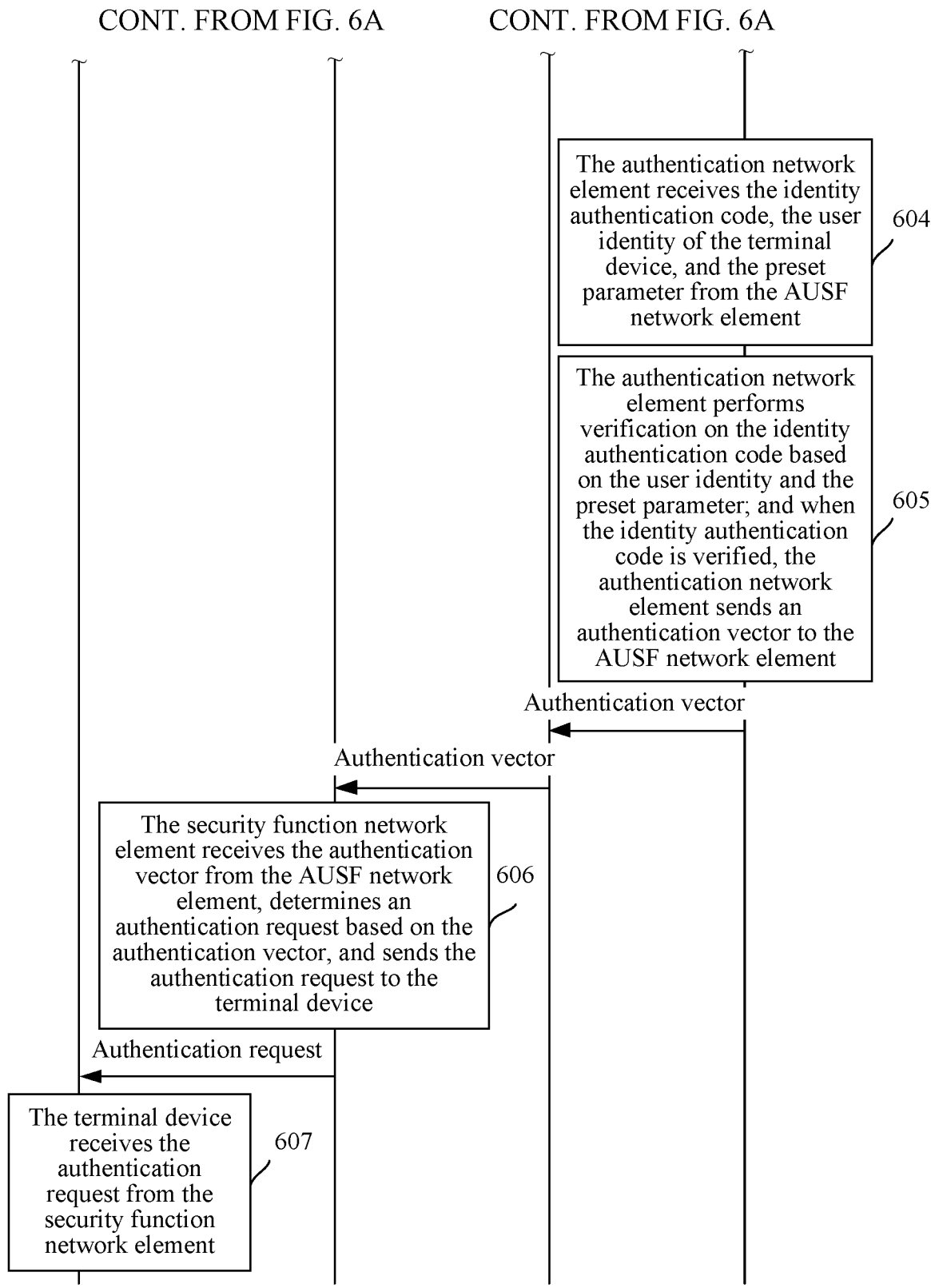

FIG. 6A and FIG. 6B are schematic flowcharts of a communication method according to an embodiment of this application. The method may be based on any one of the embodiments shown in FIG. 2A and FIG. 2B to FIG. 5. This is not limited. Referring to FIG. 6A and FIG. 6B, the method includes the following steps.

Step 601: A terminal device obtains an identity authentication code based on a user identity of the terminal device, a preset parameter, and a root key of the terminal device.

The identity authentication code may be used to sign the user identity of the terminal device.

The user identity may be a subscriber permanent identity (SUPI), an international mobile subscriber identity (IMSI), or the like of the terminal device. Examples are not described one by one herein.

Specifically, step 601 may include: obtaining, by the terminal device, a generation parameter based on the preset parameter, the root key, and a public key; and obtaining, by the terminal device, the identity authentication code based on the generation parameter and the user identity.

The public key may be a key used to encrypt the user identity, and the public key may be preconfigured by a core network for the terminal device.

For example, the terminal device performs hash calculation on the preset parameter, the root key, and the public key, and uses a calculation result as the generation parameter. Further, the terminal device performs hash calculation on the generation parameter and the user identity, and uses a calculation result as the identity authentication code.

The preset parameter may be an SQN or a random number, or may be a number generated in another manner. This is not limited in this embodiment of this application.

It should be noted that, when the preset parameter is a random number, a new random number may be generated only when an SQN changes. This limits a quantity of generation times of the preset parameter, and prevents a malicious device from obtaining the identity authentication code by using a brute force cracking method when the malicious device obtains sufficient preset parameters.

Step 602: The terminal device sends the identity authentication code, a ciphertext of the user identity, and a plaintext or ciphertext of the preset parameter to an AUSF network element.

The terminal device may send the identity authentication code, the ciphertext of the user identity, and the plaintext or ciphertext of the preset parameter to the AUSF network element by using a security function network element. For the security function network element, refer to related descriptions in the embodiment shown in FIG. 2A and FIG. 2B. Details are not described again.

For example, the terminal device may add the identity authentication code, the ciphertext of the user identity, and the plaintext or ciphertext of the preset parameter to a registration request message or an attach request message, and send the registration request message or the attach request message to the security function network element; further, the security function network element sends the identity authentication code, the user identity of the terminal device, and the preset parameter to the AUSF network element.

The ciphertext of the user identity may be a bit sequence obtained after the user identity is encrypted by using the public key. Correspondingly, the ciphertext of the preset parameter may be a bit sequence obtained after the preset parameter is encrypted by using the public key.

Step 603: The AUSF network element receives the identity authentication code, the user identity of the terminal device, and the preset parameter from the security function network element, and sends the identity authentication code, the user identity of the terminal device, and the preset parameter to an authentication network element.

Step 604: The authentication network element receives the identity authentication code, the user identity of the terminal device, and the preset parameter from the AUSF network element.

Step 605: The authentication network element performs verification on the identity authentication code based on the user identity and the preset parameter; and when the identity authentication code is verified, the authentication network element sends an authentication vector to the AUSF network element.

Specifically, step 605 may include:

the authentication network element may obtain, based on the user identity, a root key that is of the terminal device and that corresponds to the user identity, where a correspondence between the user identity and the root key is preset;

the authentication network element obtains a generation parameter based on the root key and the preset parameter, and obtains an expected identity authentication code based on the generation parameter and the user identity; and the authentication network element compares the expected identity authentication code with the received identity authentication code, and when the expected identity authentication code is the same as the identity authentication code, may determine that the identity authentication code is verified; or when the expected identity authentication code is different from the identity authentication code, may determine that the identity authentication code fails to be verified.

Correspondingly, after receiving the authentication vector, the AUSF network element sends the authentication vector to the security function network element.

Step 606: The security function network element receives the authentication vector from the AUSF network element, and sends an authentication request to the terminal device based on the authentication vector.

The security function network element may determine specific content of the authentication request based on the authentication vector. For details, refer to related descriptions in the embodiment shown in FIG. 2A and FIG. 2B. Details are not described again.

Step 607: The terminal device receives the authentication request from the security function network element.

The authentication request is determined by the security function network element based on the authentication vector generated by the authentication network element.

In the method provided in this embodiment, after the terminal device sends the identity authentication code, the ciphertext of the user identity, and the plaintext or ciphertext of the preset parameter, the authentication network element may perform the verification on the identity authentication code based on the user identity and the preset parameter, and when verifying the identity authentication code, determine that the terminal device is a terminal device corresponding to the user identity, to complete authentication on the terminal device. The foregoing method protects the terminal device from an unauthorized attack by another device that masquerades as the terminal device after the another device intercepts the user identity of the terminal device, and improves security of the terminal device.

Optionally, when the identity authentication code fails to be verified, the authentication network element may send a failure response to the AUSF network element, where the failure response indicates that the terminal device fails to verify the authentication request. The AUSF network element may forward the failure response to the mobility management system network element, and the mobility management system network element may send a reject response message to the terminal device based on the failure response, to reject a request (for example, a registration request or an attach request) of the terminal device. In this scenario, when the identity authentication code fails to be verified, the authentication network element may determine that the terminal device sending the user identity is not an authorized device having the user identity, and therefore does not send the authentication vector to the AUSF network element. This can prevent another device from obtaining the authentication request of the terminal device based on the authentication vector, and improve security of the terminal device.

Figure 7:
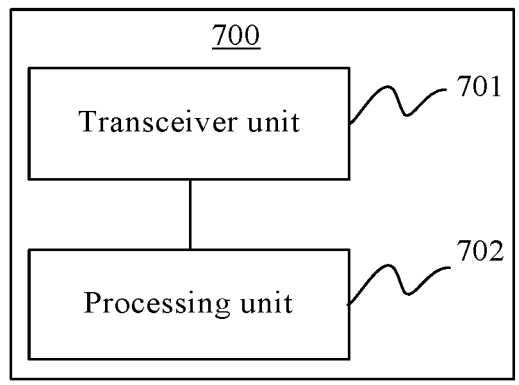
FIG. 7 is a schematic structural diagram of a communications apparatus according to an embodiment of this application.

FIG. 7 is a schematic structural diagram of a communications apparatus 700 according to an embodiment of this application. The communications apparatus 700 may be configured to perform the actions of the terminal device in the procedure shown in any one of FIG. 2A and FIG. 2B to FIG. 5. The communications apparatus 700 may be a terminal device, or a chip or a system-on-a-chip in the terminal device. Specifically, the communications apparatus 700 includes a transceiver unit 701 and a processing unit 702.

The transceiver unit 701 is configured to receive a first authentication request from a security function network element.

The processing unit 702 is configured to obtain authentication reference information based on the first authentication request, where the authentication reference information is a response value, a resynchronization token, or a cause indication value.

The transceiver unit 701 is configured to send an authentication response message to the security function network element, where the authentication response message includes a first information element used to carry the response value, a second information element used to carry the resynchronization token, and a third information element used to carry the cause indication value, and the authentication reference information is carried in an information element corresponding to the authentication reference information.

In the foregoing solution, whether the authentication reference information obtained by the terminal device based on the first authentication request is the response value, the resynchronization token, or the cause indication value, the authentication response message sent by the terminal device to the security function network element includes the first information element, the second information element, and the third information element. According to the communications apparatus 700, because the authentication response message sent by the terminal device is in a uniform format, another device cannot directly determine, based on a format of the authentication response message, whether the authentication response message carries the response value, the resynchronization token, or the cause indication value, and cannot determine whether the terminal device verifies the first authentication request. This improves security of the terminal device.

In an optional implementation, the authentication reference information is the response value; and before the transceiver unit 701 sends the authentication response message to the security function network element, the processing unit 702 is further configured to:

add the authentication reference information to the first information element, add a first random number to the second information element, and add a second random number to the third information element.

In the foregoing solution, the terminal device may add the authentication reference information, the first random number, and the second random number to the first information element, the second information element, and the third information element, respectively, so that the authentication response message in a uniform format can be generated. After determining that the first information element carries the response value, a network side (for example, the security function network element) may ignore the second information element and the third information element. Therefore, compatibility with an existing standard protocol is implemented while security of the terminal device is ensured.

In an optional implementation, the authentication reference information is the resynchronization token; and before the transceiver unit 701 sends the authentication response message to the security function network element, the processing unit 702 is further configured to:

add the authentication reference information to the second information element, add a third random number to the first information element, and add a second random number to the third information element.

In the foregoing solution, the terminal device may add the third random number, the authentication reference information, and the second random number to the first information element, the second information element, and the third information element, respectively, so that the authentication response message in a uniform format can be generated. After determining that the first information element does not carry the response value, a network side (for example, the security function network element) may obtain, based on the second information element and the third information element, a cause for failure to verify the first authentication request by the terminal device. Therefore, compatibility with an existing standard protocol is implemented while security of the terminal device is ensured.

In an optional implementation, the authentication reference information is the cause indication value; and before the transceiver unit 701 sends the authentication response message to the security function network element, the processing unit 702 is further configured to:

add the authentication reference information to the third information element, add a third random number to the first information element, and add a first random number to the second information element.

In the foregoing solution, the terminal device may add the third random number, the first random number, and the authentication reference information to the first information element, the second information element, and the third information element, respectively, so that the authentication response message in a uniform format can be generated. When determining that information carried in the first information element and the second information element fails to be verified, a network side (for example, the security function network element) may obtain, based on the cause indication value carried in the third information element, a cause for failure to verify the first authentication request by the terminal device. Therefore, compatibility with an existing standard protocol is implemented while security of the terminal device is ensured.

Figure 8:
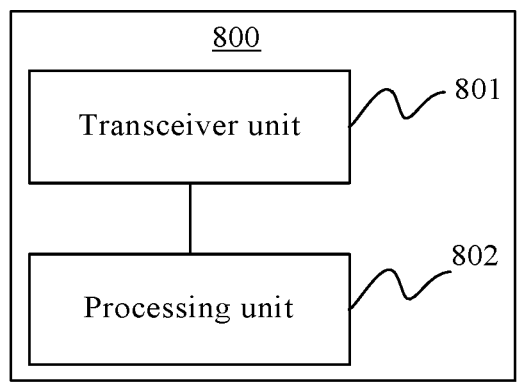
FIG. 8 is a schematic structural diagram of a communications apparatus according to an embodiment of this application.

FIG. 8 is a schematic structural diagram of a communications apparatus 800 according to an embodiment of this application. The communications apparatus 800 may perform the actions of the security function network element in the procedure shown in any one of FIG. 2A and FIG. 2B to FIG. 5. The communications apparatus 800 may be a security function network element, or a chip or a system-on-a-chip in the security function network element.

The communications apparatus 800 includes a transceiver unit 801 and a processing unit 802.

The transceiver unit 801 is configured to send a first authentication request to a terminal device; and receive an authentication response message from the terminal device, where the authentication response message includes a first information element used to carry a response value, a second information element used to carry a resynchronization token, and a third information element used to carry a cause indication value.

The processing unit 802 is configured to: when determining that information carried in the first information element is verified, send a security mode command to the terminal device by using the transceiver unit 801.

In the foregoing solution, after receiving the authentication response message, when determining that the information carried in the first information element in the authentication response message is verified, the security function network element ignores the second information element and the third information element in the authentication response message, and performs security key and algorithm negotiation with the terminal device. Because the authentication response message sent by the terminal device is in a uniform format, another device cannot directly determine, based on a format of the authentication response message, whether the authentication response message carries the response value, the resynchronization token, or the cause indication value, and cannot determine whether the terminal device verifies the first authentication request. This improves security of the terminal device.

In an optional implementation, the processing unit 802 is further configured to:

when the information carried in the first information element fails to be verified, send the second information element to an authentication network element by using the transceiver unit 801.

The processing unit is further configured to:

receive an authentication vector from the authentication network element, and send a second authentication request to the terminal device based on the authentication vector by using the transceiver unit 801; or receive a verification result from the authentication network element by using the transceiver unit 801, where the verification result is used to indicate that information carried in the second information element fails to be verified; and send, by using the transceiver unit 801, an authentication reject message to the terminal device based on the cause indication value carried in the third information element.

Figure 9:
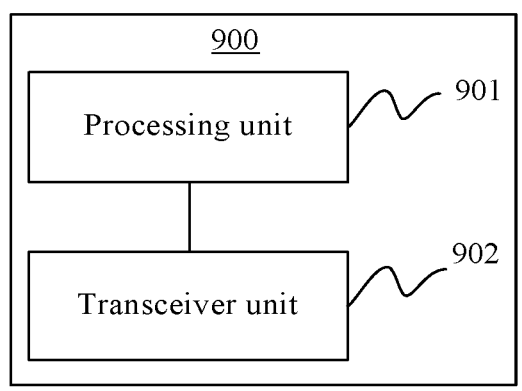
FIG. 9 is a schematic structural diagram of a communications apparatus according to an embodiment of this application.

FIG. 9 is a schematic structural diagram of a communications apparatus 900 according to an embodiment of this application. The communications apparatus 900 may perform the actions of the terminal device in the procedure shown in FIG. 6A and FIG. 6B. The communications apparatus 900 may be a terminal device, or a chip or a system-on-a-chip in the terminal device. The communications apparatus 900 includes a processing unit 901 and a transceiver unit 902.

The processing unit 901 is configured to obtain an identity authentication code based on a user identity of the terminal device, a preset parameter, and a root key of the terminal device.

The transceiver unit 902 is configured to send the identity authentication code, a ciphertext of the user identity, and a plaintext or ciphertext of the preset parameter to an AUSF network element.

In the foregoing solution, the terminal device sends the identity authentication code, the ciphertext of the user identity, and the plaintext or ciphertext of the preset parameter to the authentication server function network element, so that an authentication network element can perform verification on the identity authentication code based on the user identity and the preset parameter, and when verifying the identity authentication code, determine that the terminal device is a terminal device corresponding to the user identity, to complete authentication on the terminal device. The communications apparatus 900 protects the terminal device from an unauthorized attack by another device that masquerades as the terminal device and sends the user identity of the terminal device to a network side after the another device intercepts the user identity of the terminal device, and improves security of the terminal device.

In an optional implementation, the transceiver unit 902 is further configured to:

receive an authentication request from a security function network element, where the authentication request is determined by the security function network element based on an authentication vector generated by the authentication network element.

In an optional implementation, the processing unit 901 is specifically configured to:

obtain a generation parameter based on the preset parameter, the root key, and a public key, where the public key is a key used to encrypt the user identity; and obtain the identity authentication code based on the generation parameter and the user identity.

In an optional implementation, the preset parameter is a sequence number SQN or a random number.

Figure 10:
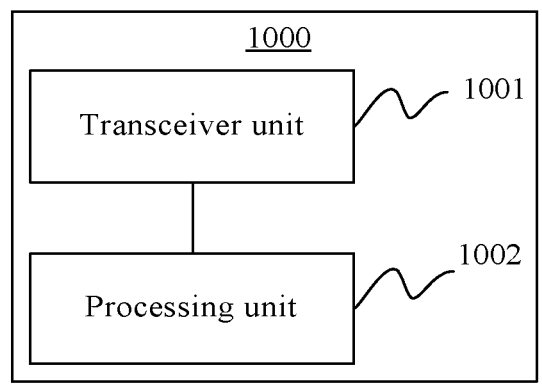
FIG. 10 is a schematic structural diagram of a communications apparatus according to an embodiment of this application.

FIG. 10 is a schematic structural diagram of a communications apparatus 1000 according to an embodiment of this application. The communications apparatus 1000 may perform the actions of the authentication network element in the procedure shown in FIG. 6A and FIG. 6B. The communications apparatus 1000 may be an authentication network element, or a chip or a system-on-a-chip in the authentication network element. The communications apparatus 1000 includes a transceiver unit 1001 and a processing unit 1002.

The transceiver unit 1001 is configured to receive an identity authentication code, a user identity of a terminal device, and a preset parameter from an AUSF network element.

The processing unit 1002 is configured to perform verification on the identity authentication code based on the user identity and the preset parameter; and when the identity authentication code is verified, send an authentication vector to the AUSF network element by using the transceiver unit 1001.

In the foregoing solution, after receiving the identity authentication code, the user identity of the terminal device, and the preset parameter, when verifying the identity authentication code based on the user identity and the preset parameter, the authentication network element may determine that the terminal device is a terminal device corresponding to the user identity, to complete authentication on the terminal device. The communications apparatus 1000 prevents another device from masquerading as the terminal device and improves security of the terminal device.

In an optional implementation, the processing unit 1002 is specifically configured to:

obtain a root key of the terminal device based on the user identity; and obtain a generation parameter based on the root key and the preset parameter, and obtain an expected identity authentication code based on the generation parameter and the user identity; where when the expected identity authentication code is the same as the identity authentication code, the identity authentication code is verified; or when the expected identity authentication code is different from the identity authentication code, the identity authentication code fails to be verified.

In an optional implementation, when the identity authentication code fails to be verified, the transceiver unit 1001 is further configured to:

send a failure response to the AUSF network element.

Figure 11:
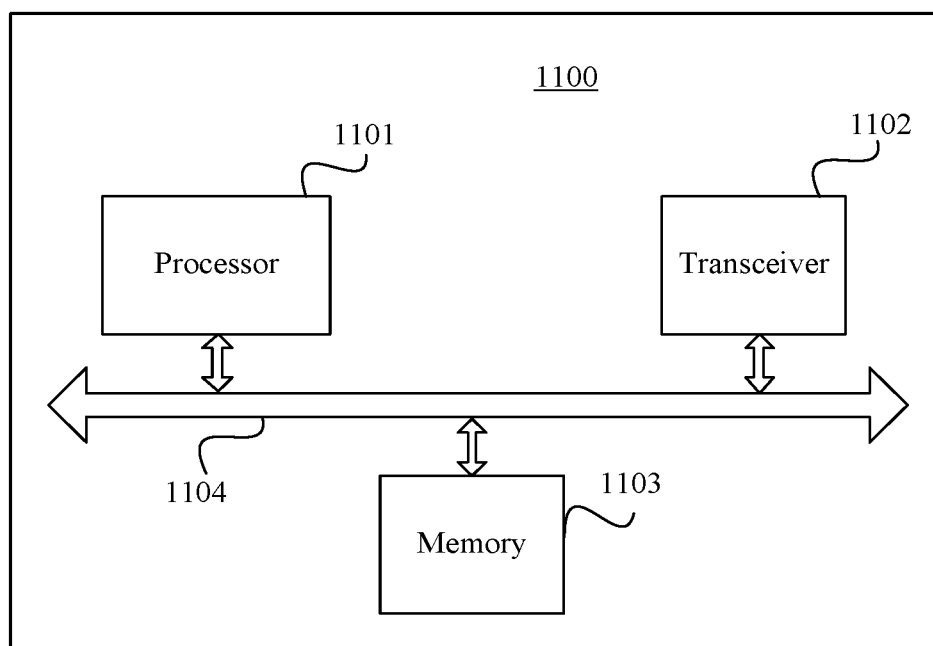
FIG. 11 is a schematic structural diagram of a communications apparatus according to an embodiment of this application.

FIG. 11 is a schematic structural diagram of a communications apparatus 1100 according to an embodiment of this application. The communications apparatus 1100 may be a terminal device, and may be configured to perform the actions of the terminal device in the procedure shown in any one of FIG. 2A and FIG. 2B to FIG. 5.

Referring to FIG. 11, the communications apparatus 1100 includes a processor 1101, a transceiver 1102, and a memory 1103. The processor 1101, the transceiver 1102, and the memory 1103 are connected to each other by using a bus 1104.

The processor 1101 may be a central processing unit (CPU), a network processor (NP), or a combination of a CPU and an NP. The processor 1101 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1103 may include a volatile memory, for example, a random access memory (RAM); or the memory 1103 may include a non-volatile memory, for example, a flash memory, a hard disk drive (HDD), or a solid-state drive (SSD); or the memory 1103 may include a combination of the foregoing types of memories.

The bus 1104 may be a peripheral component interconnect (PCI) bus, an extended industry standard architecture (EISA) bus, and or the like. The bus 1104 may be classified as an address bus, a data bus, a control bus, and the like. For ease of representation, only one double-headed arrow is used to represent the bus 1104 in FIG. 11, but this does not mean that there is only one bus or only one type of bus.

The memory 1103 may be configured to store a program instruction. The processor 1101 invokes the program instruction stored in the memory 1103, to perform one or more steps of the terminal device or an optional implementation in the foregoing method embodiments, so that the communications apparatus 1100 implements a function in the foregoing method.

The transceiver 1102 is configured to receive a first authentication request from a security function network element.

The processor 1101 is configured to obtain authentication reference information based on the first authentication request, where the authentication reference information is a response value, a resynchronization token, or a cause indication value.

The transceiver 1102 is configured to send an authentication response message to the security function network element, where the authentication response message includes a first information element used to carry the response value, a second information element used to carry the resynchronization token, and a third information element used to carry the cause indication value, and the authentication reference information is carried in an information element corresponding to the authentication reference information.

In the foregoing solution, whether the authentication reference information obtained by the communications apparatus based on the first authentication request is the response value, the resynchronization token, or the cause indication value, the authentication response message sent to the security function network element includes the first information element, the second information element, and the third information element. According to the communications apparatus 1100, because the authentication response message sent by the communications apparatus is in a uniform format, another device cannot directly determine, based on a format of the authentication response message, whether the authentication response message carries the response value, the resynchronization token, or the cause indication value, and cannot determine whether the communications apparatus verifies the first authentication request. This improves security of the communications apparatus.

In an optional implementation, the authentication reference information is the response value; and
   before the transceiver 1102 sends the authentication response message to the security function network element, the processor 1101 is further configured to:
   add the authentication reference information to the first information element, add a first random number to the second information element, and add a second random number to the third information element.

In the foregoing solution, the communications apparatus may add the authentication reference information, the first random number, and the second random number to the first information element, the second information element, and the third information element, respectively, so that the authentication response message in a uniform format can be generated. After determining that the first information element carries the response value, a network side (for example, the security function network element) may ignore the second information element and the third information element. Therefore, compatibility with an existing standard protocol is implemented while security of the communications apparatus is ensured.

In an optional implementation, the authentication reference information is the resynchronization token; and
   before the transceiver 1102 sends the authentication response message to the security function network element, the processor 1101 is further configured to:
   add the authentication reference information to the second information element, add a third random number to the first information element, and add a second random number to the third information element.

In the foregoing solution, the communications apparatus may add the third random number, the authentication reference information, and the second random number to the first information element, the second information element, and the third information element, respectively, so that the authentication response message in a uniform format can be generated. After determining that the first information element does not carry the response value, a network side (for example, the security function network element) may obtain, based on the second information element and the third information element, a cause for failure to verify the first authentication request by the communications apparatus. Therefore, compatibility with an existing standard protocol is implemented while security of the communications apparatus is ensured.

In an optional implementation, the authentication reference information is the cause indication value; and
   before the transceiver 1102 sends the authentication response message to the security function network element, the processor 1101 is further configured to:
   add the authentication reference information to the third information element, add a third random number to the first information element, and add a first random number to the second information element.

In the foregoing solution, the communications apparatus may add the third random number, the first random number, and the authentication reference information to the first information element, the second information element, and the third information element, respectively, so that the authentication response message in a uniform format can be generated. When determining that information carried in the first information element and the second information element fails to be verified, a network side (for example, the security function network element) may obtain, based on the cause indication value carried in the third information element, a cause for failure to verify the first authentication request by the communications apparatus. Therefore, compatibility with an existing standard protocol is implemented while security of the communications apparatus is ensured.

An embodiment of this application further provides a communications apparatus. The communications apparatus includes a processor and a memory. The memory stores a computer program. When the processor reads and executes the computer program stored in the memory, the communications apparatus is enabled to implement the method performed by the terminal device in the procedure shown in any one of FIG. 2A and FIG. 2B to FIG. 5.

An embodiment of this application further provides a chip. The chip is connected to a memory, where the memory stores a computer program. The chip is configured to read and execute the computer program stored in the memory, to implement the method performed by the terminal device in the procedure shown in any one of FIG. 2A and FIG. 2B to FIG. 5.

Figure 12:
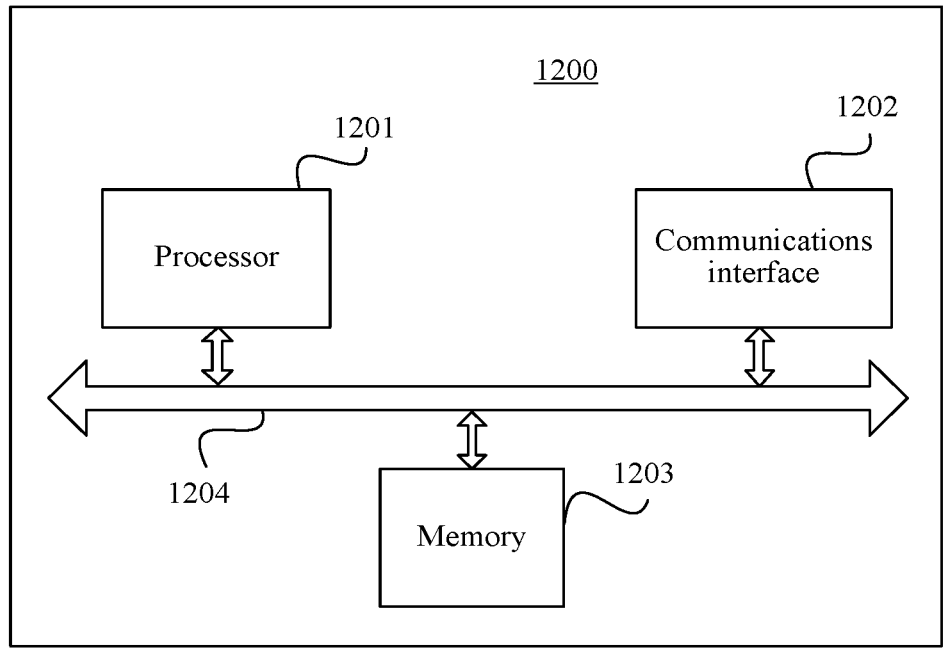
FIG. 12 is a schematic structural diagram of another communications apparatus according to an embodiment of this application.

FIG. 12 is a schematic structural diagram of a communications apparatus 200 according to an embodiment of this application. The communications apparatus 1200 may perform the actions of the security function network element in the procedure shown in any one of FIG. 2A and FIG. 2B to FIG. 5.

The communications apparatus 1200 includes a processor 1201, a communications interface 1202, and a memory 1203. The processor 1201, the communications interface 1202, and the memory 1203 are connected to each other by using a bus 1204. For specific content of the foregoing modules, refer to descriptions of related modules in FIG. 11. Details are not described herein again.

The communications interface 1202 may be a wired communications interface 1202, a wireless communications interface, or a combination thereof. The wired communications interface may be, for example, an Ethernet interface. The Ethernet interface may be an optical interface, an electrical interface, or a combination thereof. The wireless communications interface may be a wireless local area network interface.

The communications interface 1202 is configured to send a first authentication request to a terminal device; and receive an authentication response message from the terminal device, where the authentication response message includes a first information element used to carry a response value, a second information element used to carry a resynchronization token, and a third information element used to carry a cause indication value.

The processor 1201 is configured to: when determining that information carried in the first information element is verified, send a security mode command to the terminal device by using the communications interface 1202.

In the foregoing solution, after receiving the authentication response message, when determining that the information carried in the first information element in the authentication response message is verified, the communications apparatus 1200 ignores the second information element and the third information element in the authentication response message, and performs security key and algorithm negotiation with the terminal device. Because the authentication response message sent by the terminal device is in a uniform format, another device cannot directly determine, based on a format of the authentication response message, whether the authentication response message carries the response value, the resynchronization token, or the cause indication value, and cannot determine whether the terminal device verifies the first authentication request. This improves security of the terminal device.

In an optional implementation, the processor 1201 is further configured to:

when the information carried in the first information element fails to be verified, send the second information element to an authentication network element by using the communications interface 1202.

The processor is further configured to:

receive an authentication vector from the authentication network element, and send a second authentication request to the terminal device based on the authentication vector by using the communications interface 1202; or receive a verification result from the authentication network element by using the communications interface 1202, where the verification result is used to indicate that information carried in the second information element fails to be verified; and send an authentication reject message to the terminal device based on the cause indication value carried in the third information element by using the communications interface 1202.

Figure 13:
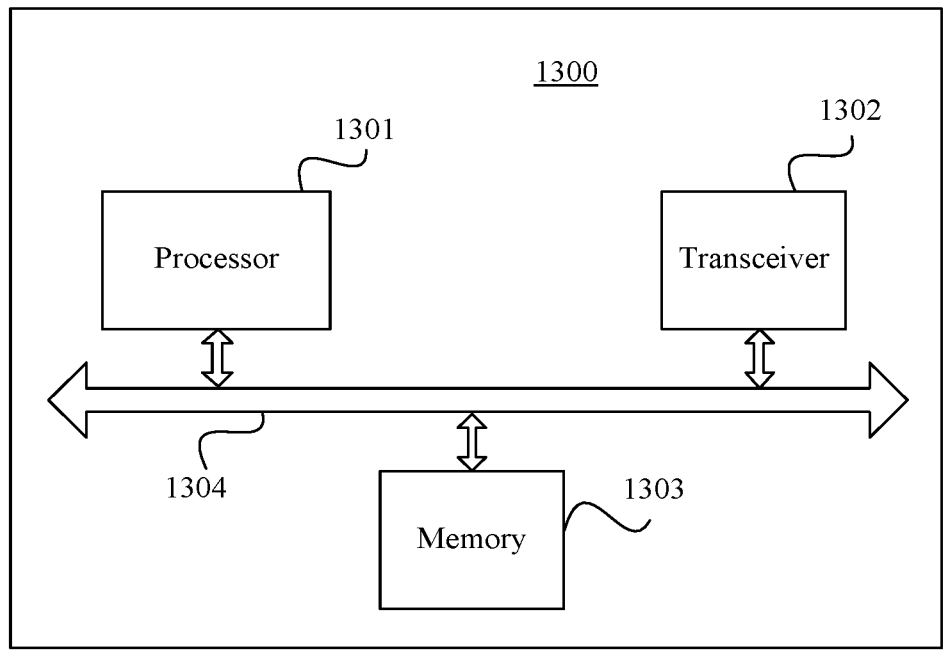
FIG. 13 is a schematic structural diagram of another communications apparatus according to an embodiment of this application.

FIG. 13 is a schematic structural diagram of a communications apparatus 1300 according to an embodiment of this application. The communications apparatus 1300 may perform the actions of the terminal device in the procedure shown in FIG. 6A and FIG. 6B.

The communications apparatus 1300 includes a processor 1301, a transceiver 1302, and a memory 1303. The processor 1301, the transceiver 1302, and the memory 1303 are connected to each other by using a bus 1304. For specific content of the foregoing modules, refer to descriptions of related modules in FIG. 11. Details are not described herein again.

The processor 1301 is configured to obtain an identity authentication code based on a user identity of a terminal device, a preset parameter, and a root key of the communications apparatus.

The transceiver 1302 is configured to send the identity authentication code, a ciphertext of the user identity, and a plaintext or ciphertext of the preset parameter to an authentication server function AUSF network element.

In the foregoing solution, the communications apparatus sends the identity authentication code, the ciphertext of the user identity, and the plaintext or ciphertext of the preset parameter to the authentication server function network element, so that an authentication network element can perform verification on the identity authentication code based on the user identity and the preset parameter, and when verifying the identity authentication code, determine that the communications apparatus is a device corresponding to the user identity, to complete verification on the communications apparatus. The communications apparatus 1300 protects the communications apparatus from an unauthorized attack by another device that masquerades as the communications apparatus and sends the user identity of the communications apparatus to a network side after the another device intercepts the user identity of the communications apparatus, and improves security of the communications apparatus.

In an optional implementation, the transceiver 1302 is further configured to:

receive an authentication request from a security function network element, where the authentication request is determined by the security function network element based on an authentication vector generated by the authentication network element.

In an optional implementation, the processor 1301 is specifically configured to:

obtain a generation parameter based on the preset parameter, the root key, and a public key, where the public key is a key used to encrypt the user identity; and obtain the identity authentication code based on the generation parameter and the user identity.

In an optional implementation, the preset parameter is a sequence number SQN or a random number.

An embodiment of this application further provides a communications apparatus. The communications apparatus includes a processor and a memory. The memory stores a computer program. When the processor reads and executes the computer program stored in the memory, the communications apparatus is enabled to implement the method performed by the terminal device in the procedure shown in FIG. 6A and FIG. 6B.

An embodiment of this application further provides a chip. The chip is connected to a memory, where the memory stores a computer program. The chip is configured to read and execute the computer program stored in the memory, to implement the method performed by the terminal device in the procedure shown in FIG. 6A and FIG. 6B.

Figure 14:
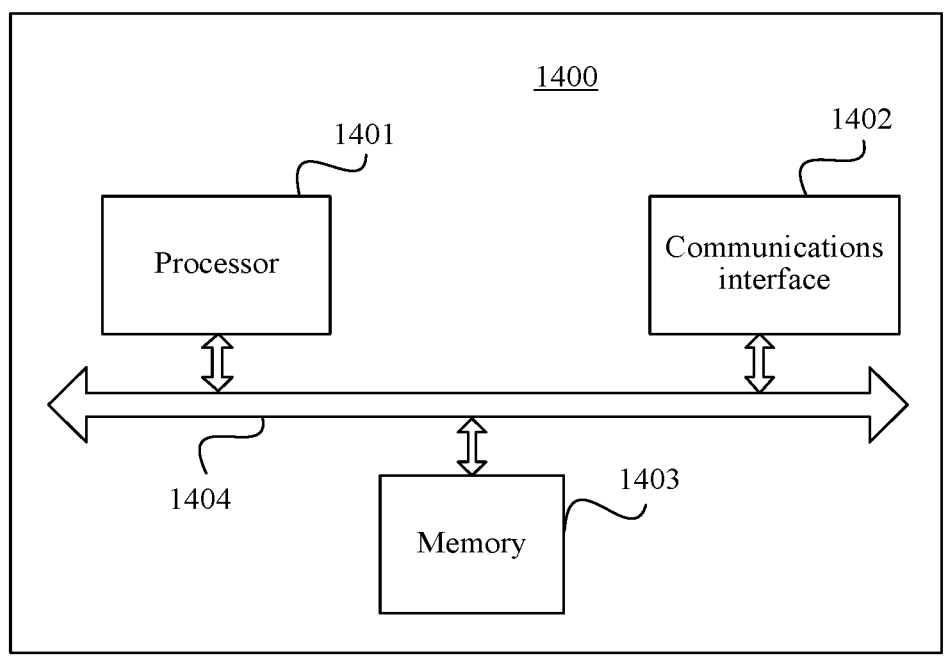
FIG. 14 is a schematic structural diagram of still another communications apparatus according to an embodiment of this application.

FIG. 14 is a schematic structural diagram of a communications apparatus 1400 according to an embodiment of this application. The communications apparatus 1400 may perform the actions of the authentication network element in the procedure shown in FIG. 6A and FIG. 6B.

The communications apparatus 1400 includes a processor 1401, a communications interface 1402, and a memory 1403. The processor 1401, the communications interface 1402, and the memory 1403 are connected to each other by using a bus 1404. For specific content of the foregoing modules, refer to descriptions of related modules in FIG. 11. Details are not described herein again.

The communications interface 1402 is configured to receive an identity authentication code, a user identity of a terminal device, and a preset parameter from an authentication server function AUSF network element.

The processor 1401 is configured to: perform verification on the identity authentication code based on the user identity and the preset parameter; and when the identity authentication code is verified, send an authentication vector to the AUSF network element by using the communications interface 1402.

In the foregoing solution, after receiving the identity authentication code, the user identity of the terminal device, and the preset parameter, when verifying the identity authentication code based on the user identity and the preset parameter, the communications apparatus 1400 may determine that the terminal device is a terminal device corresponding to the user identity, to complete authentication on the terminal device. The communications apparatus 1400 prevents another device from masquerading as the terminal device and improves security of the terminal device.

In an optional implementation, the processor 1401 is specifically configured to:

obtain a root key of the terminal device based on the user identity; and obtain a generation parameter based on the root key and the preset parameter, and obtain an expected identity authentication code based on the generation parameter and the user identity; where when the expected identity authentication code is the same as the identity authentication code, the identity authentication code is verified; or when the expected identity authentication code is different from the identity authentication code, the identity authentication code fails to be verified.

In an optional implementation, when the identity authentication code fails to be verified, the communications interface 1402 is further configured to:

send a failure response to the AUSF network element.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Definitely, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
    receiving, by a terminal device, a first authentication request from a security function network element;
    obtaining, by the terminal device, authentication reference information based on the first authentication request, wherein the authentication reference information is a response value, a resynchronization token, or a cause indication value; and
    sending, by the terminal device, an authentication response message to the security function network element, wherein the authentication response message comprises a first information element used to carry the response value, a second information element used to carry the resynchronization token, and a third information element used to carry the cause indication value, and the authentication reference information is carried in an information element corresponding to the authentication reference information.

2. The method according to claim 1, wherein the authentication reference information is the response value; and
    before the sending, by the terminal device, the authentication response message to the security function network element, the method further comprises:
    adding, by the terminal device, the authentication reference information to the first information element, adding a first random number to the second information element, and adding a second random number to the third information element.

3. The method according to claim 1, wherein the authentication reference information is the resynchronization token; and
    before the sending, by the terminal device, the authentication response message to the security function network element, the method further comprises:
    adding, by the terminal device, the authentication reference information to the second information element, adding a third random number to the first information element, and adding a second random number to the third information element.

4. The method according to claim 1, wherein the authentication reference information is the cause indication value; and
    before the sending, by the terminal device, the authentication response message to the security function network element, the method further comprises:
    adding, by the terminal device, the authentication reference information to the third information element, adding a third random number to the first information element, and adding a first random number to the second information element.

5. A method, comprising:
    sending, by a security function network element, a first authentication request to a terminal device;
    receiving, by the security function network element, an authentication response message from the terminal device, wherein the authentication response message comprises a first information element used to carry a response value, a second information element used to carry a resynchronization token, and a third information element used to carry a cause indication value; and
    in response to information carried in the first information element being verified, sending, by the security function network element, a security mode command to the terminal device.

6. The method according to claim 5, further comprising:
    in response to the information carried in the first information element failing to be verified, sending, by the security function network element, the second information element to an authentication network element;
    receiving, by the security function network element:
        an authentication vector from the authentication network element, and sending a second authentication request to the terminal device based on the authentication vector; or a verification result from the authentication network element, wherein the verification result is used to indicate that information carried in the second information element fails to be verified, and sending, by the security function network element, an authentication reject message to the terminal device based on the cause indication value carried in the third information element.

7. An apparatus, comprising:

a processor coupled with a non-transitory storage medium storing executable instructions;

wherein the executable instructions, when executed by the processor, cause the processor to:

receive a first authentication request from a security function network element;

obtain authentication reference information based on the first authentication request, wherein the authentication reference information is a response value, a resynchronization token, or a cause indication value; and send an authentication response message to the security function network element, wherein the authentication response message comprises a first information element used to carry the response value, a second information element used to carry the resynchronization token, and a third information element used to carry the cause indication value, and the authentication reference information is carried in an information element corresponding to the authentication reference information.

8. The apparatus according to claim 7, wherein the authentication reference information is the response value; and before sending the authentication response message to the security function network element, the processor is further configured to:

adding the authentication reference information to the first information element, add a first random number to the second information element, and add a second random number to the third information element.

9. The apparatus according to claim 7, wherein the authentication reference information is the resynchronization token; and before sending the authentication response message to the security function network element, the processor is further configured to:

adding the authentication reference information to the second information element, add a third random number to the first information element, and add a second random number to the third information element.

10. The apparatus according to claim 7, wherein the authentication reference information is the cause indication value; and before sending the authentication response message to the security function network element, the processor is further configured to:

add the authentication reference information to the third information element, add a third random number to the first information element, and add a first random number to the second information element.

* * * * *